US008121892B2

(12) United States Patent
Baggett, Jr. et al.

(10) Patent No.: US 8,121,892 B2
(45) Date of Patent: Feb. 21, 2012

(54) METHOD, SYSTEM, AND COMPUTER PROGRAM PRODUCT FOR ASSESSING INFORMATION SECURITY

(75) Inventors: Charlie C. Baggett, Jr., Ellicott City, MD (US); John J. Adams, Clarksville, MD (US)

(73) Assignee: Safeoperations, Inc., Columbia, MD (US)

( * ) Notice: Subject to any disclaimer, the term of this patent is extended or adjusted under 35 U.S.C. 154(b) by 834 days.

(21) Appl. No.: 11/144,946

(22) Filed: Jun. 6, 2005

(65) Prior Publication Data

US 2005/0234755 A1 Oct. 20, 2005

Related U.S. Application Data

(62) Division of application No. 09/558,387, filed on Apr. 26, 2000, now Pat. No. 6,925,443.

(51) Int. Cl.
*G06Q 30/00* (2006.01)

(52) U.S. Cl. ........... 705/14; 705/23; 705/15; 705/16; 705/17; 705/18; 705/19; 705/20; 705/21; 705/22; 709/224; 714/49; 714/805

(58) Field of Classification Search .......... 70/14–23
See application file for complete search history.

(56) References Cited

U.S. PATENT DOCUMENTS

| | | | |
|---|---|---|---|
| 5,485,409 A | 1/1996 | Gupta et al. | 395/186 |
| 5,701,400 A | 12/1997 | Amado | 395/76 |
| 5,784,539 A | 7/1998 | Lenz | 395/50 |
| 5,850,516 A | 12/1998 | Schneier | 395/186 |
| 5,892,903 A | 4/1999 | Klaus | 395/187.01 |
| 5,978,784 A | 11/1999 | Fagg, III et al. | 706/45 |
| 5,991,743 A | 11/1999 | Irving et al. | 705/36 |
| 6,021,404 A | 2/2000 | Moukheibir | 706/46 |
| 6,064,972 A | 5/2000 | Jankowitz et al. | 705/7 |
| 6,076,166 A | 6/2000 | Moshfeghi et al. | 713/201 |
| 6,088,801 A | 7/2000 | Grecsek | 713/200 |
| 6,092,060 A | 7/2000 | Guinta et al. | 706/47 |
| 6,098,047 A | 8/2000 | Oku et al. | 705/7 |
| 6,112,190 A | 8/2000 | Fletcher et al. | 705/38 |

(Continued)

OTHER PUBLICATIONS

Cortez, "Information Policy Audit: A Case Study of an Organizational Analysis Tool" (Spring 1996).*

(Continued)

*Primary Examiner* — Calvin L. Hewitt, II
*Assistant Examiner* — Cristina Owen Sherr
(74) *Attorney, Agent, or Firm* — Garrett IP, LLC

(57) ABSTRACT

A method, system and computer program product for assessing information security interviews users regarding technical and non-technical issues. In an embodiment, users are interviewed based on areas of expertise. In an embodiment, information security assessments are performed on domains within an enterprise, the results of which are rolled-up to perform an information security assessment across the enterprise. The invention optionally includes application specific questions and vulnerabilities and/or industry specific questions and vulnerabilities. The invention optionally permits users to query a repository of expert knowledge. The invention optionally provides users with working aids. The invention optionally permits users to execute third party testing/diagnostic applications. The invention, optionally combines results of executed third party testing/diagnostic applications with user responses to interview questions, to assess information security. A system in accordance with the invention includes an inference engine, which may include a logic based inference engine, a knowledge based inference engine, and/or an artificial intelligence inference engine. In an embodiment, the invention includes an application specific tailoring tool that allows a user to tailor the system to assess security of information handled by a third party application program.

26 Claims, 19 Drawing Sheets

U.S. PATENT DOCUMENTS

| | | | |
|---|---|---|---|
| 6,151,581 A | 11/2000 | Kraftson et al. | 705/3 |
| 6,151,584 A | 11/2000 | Papierniak et al. | 705/10 |
| 6,158,010 A | 12/2000 | Moriconi et al. | 713/201 |
| 6,161,101 A | 12/2000 | Guinta et al. | 706/45 |
| 6,237,786 B1 | 5/2001 | Ginter et al. | 213/153 |
| 6,298,445 B1 * | 10/2001 | Shostack et al. | 726/25 |

OTHER PUBLICATIONS

Burch, John G. and Grudnitski, Gary, *Information Systems Theory and Practice*, New York, John Wiley & Sons, 1978, pp. 574-595.
Cortez, Edwin M. and Kazlauskas, Edward J., *Information Policy Audit: A Case Study of an Organization Analysis Tool*, Special Libraries, vol. 87, No. 2 (Spring 1996), Special Libraries Assn., Washington, D.C., pp. 88-97.
Gill, Shammi, *Auditors Present Different Strengths*, eWeek, New York, Ziff Davis Media, Feb. 26, 2001, pp. 27-28.
Machlis, Sharon, *Employee Participation Key to Successful Security*, Computer World, vol. 31, No. 30, Framingham, MA, International Data Group, Jul. 28, 1997, pp. 45 and 47.
Paul, Brooke, *Risk-Assessment Strategies*, Network Computing, Manhasset, NY, CMP Media, Inc., Oct. 30, 2000, pp. 121, 122, 126, 128, and 130.
Phillips, Ken, *KSA 4.0 KOs Intruders: NetWare Security Analysis Tool Spots, Prioritizes Breaches; Offers Tips on Improving Protection*, PC Week, New York, Ziff Davis, Jan. 1997, pp. 81 and 88.
Robinson, Teri, *Security Overkill?* Communications Week, Manhasset, NY, CMP Publications, Inc., Nov. 13, 1995, pp. 63, 67, 71, and 74.
Schaub, James L. and Biery, Ken D., *The Ultimate Computer Security Survey*, Newton, MA, Butterworth-Heinemann, 1995, 12 pages.
Schwartau, Winn, *A Modest Proposal*, [online] http://www.infosecuritymag.com/apr99/cover.htm, last visited Jul. 21, 2000, pp. 5 and 6 of 6.
Shipley, Greg, *Security Services-Request for Proposal*, Network Computing, Manhasset, NY, CMP Media Inc., Apr. 1, 1998, pp. 52-72.
Spinellis, D. et al., *Security Requirements, Risks and Recommendations for Small Enterprise and Home-Office Environments*, Information Management & Computer Security, Bradford, England, MCB University Press, 1999, pp. 121-128.
Van Dyke, Gary, *Expect Thunderstorms*, Word in Edgewise, Sep. 1998, [online] http://www.infosecuritymag.com/sept/edgewise.htm, last visited Jul. 21, 2000, 2 pages.
Vaas, Lisa, *Security Checkup: One Bank's Experience at Having Its e-Biz Links Poked, Prodded, Scanned*, eWeek, New York, Ziff Davis Media, Aug. 14, 2000, pp. 49-50, 55.
Waltz, Mitzi, *Making Security Fun*, Network World, vol. 15, No. 19, Framingham, MA, CW Communications, May 11, 1998, p. 56.
Wood, Charles Cresson, *Information Security Policies Made Easy: Version 7*, Jun. 20, 2000, Sausalito, CA, Baseline Software, Inc., 18 pages.
*A Guide for Drafting Comprehensive and Effective Computer Policies*, Mount Dora, FL, Rehman Technology Services, Inc., 1998-2000, 3 pages.
*Assessment & Audit*, Information Security, vol. 3, No. 12, Norwood, MA, International Computer Security Association, Dec. 2000, pp. 78-82.
*Conclave*, SC InfoSecurity News Magazine, vol. 10, No. 1, Framingham, MA, West Coast Pub., Jan. 1999, 1 page.
*Consultant Products for Windows*, COBRA™, Maccesfield, England, C & A Systems Security Ltd, (publication date unknown), 4 pages. (front and back).
*Dial-In Security*, SC InfoSecurity News Magazine, Framingham, MA, West Coast Pub., Mar. 2000, pp. 66-78.
*Final Recommendations*, [online] http://www.hackzone.ru/nsp/info/misc/handbook/262-264.html, last visited Feb. 2, 2000, 2 pages.
*How Effective is Your Information Security Program?*, [online] http://www.gocsi.com, 2 pp (front and back).
*I.D. Intrusion Detection, Kane Security Analyst*, Bedford, MA, System Options Limited, 1997, 2 pages.
*Infosecurity: A View from the Frontlines*, [online] http://www.infosecuritymag.com/feb99/rndtable.htm, last visited Jul. 21, 2000, 4 pages.
*L-3 Network Security Expert™ 4.1*, Product Review, The International Journal of Computer Security, Framingham, MA, West Coast Publishing, Ltd., Nov. 1999, [online] http://www.scmagazine.com/scmagazine/standalone/l3/NetSecEx/sc_expert.html, last visited Jun. 18, 2001, 4 pages.
*L3 NetworkSecurity™ Expert™ 4.1 Evaluation Guide*, Broomfield, CO, L-3 Communications Network Security Systems, LLC, 1999, 17 pages.
*NetRisk*, SC InfoSecurity News Magazine, vol. 8, No. 7, Framingham, MA, West Coast Pub., Sep. 1997, 1 page.
*Network Security Assessment Tool*, KANE Security Analyst ™, HALLoGRAM Publishing, Aurora, Co, 2000, 2 pages.
*Pilot Information Security Assurance Site is Online*, American Forces Press Service, Sep. 5, 1997. [online] http://www.fas.org/irp/news/1997/9709057.html, last visited Jun. 1, 2005, 3 pages.
*Release of SANTA/SATAN Tool and SGI Specifics*, Silicon Graphics Inc. Security Advisory, [online] http://www.fish.com~zen/satan/advisories/sgi.html, last visited Jul. 25, 2000, 8 pages.
*Risk Management Research Laboratory Overview*, [online] http://www.totse.com, 1998, 18 pages.
*RiskWatch © v8.1 for Information Systems*, Annapolis, MD, RiskWatch, 1999, 2 pages.
*STAT*, SC InfoSecurity News Magazine, vol. 10, No. 11, Framingham, MA, West Coast Pub., Nov. 1999, 1 page.
*Symantec Expert™ 4.1*, Symantec Corporation, 2000, [online] http://www.symantec.com/networksecurity/expert, 1 page. (front and back).
*The New Era in Security Risk Management*, COBRA Risk Consultant, Maccesfield, England, C & A Systems Security Ltd., 1999, 10 pages.
*What SATAN Is*, Satan Release Information, [online] http://www.cs.ruu.nl/cert-uu/satan.html, last visited Jul. 25, 2000, 3 pages.

* cited by examiner

Multiple Administrative Domain Implementation

METHOD, SYSTEM, AND COMPUTER PROGRAM PRODUCT FOR ASSESSING INFORMATION SECURITY

CROSS-REFERENCE TO RELATED APPLICATIONS

This application is a divisional application of U.S. Non-Provisional application Ser. No. 09/558,387, titled, "Method, System, and Computer Program Product for Assessing Information Security," filed Apr. 26, 2000, incorporated herein by reference in its entirety.

BACKGROUND OF THE INVENTION

1. Field of the Invention

The present invention relates to information security assessments and, more particularly, to information security assessments based on one or more of information technology infrastructure characteristics, components, configuration, connectivity, and/or architecture, information handling policies, procedures, training, and/or awareness, enterprise type, and/or user area of expertise.

2. Related Art

Corporate and government enterprises rely on a variety of types of information, such as customer information, vendor information, personnel information, and regulatory filing/compliance information. If any of this information is compromised, whether by accident or malicious intent, then the business of the enterprise suffers. Assessing and improving information security is thus a goal of an enterprise.

Information security has both technology based elements and non-technology based elements. Deficiencies in either may compromise information security.

Technology based elements of information security typically include information technology ("IT") infrastructure characteristics, components (hardware and software), configuration of the components (e.g., version and patch history of an operating system, routers, and firewalls), connectivity of the components, and architecture. Information security can be compromised by weaknesses and/or vulnerabilities in IT components, configuration of the IT components, connectivity of the IT components, architecture of the entire IT infrastructure or portions thereof. These are referred to as technology based vulnerabilities and risks.

For example, many technology components, hardware and software, have known inherent vulnerabilities and/or risks. Vulnerabilities and/or risks may vary by manufacturer, version, installed patches, etc. Similarly, the way in which IT components are configured may create vulnerabilities and/or risks to the information handled by the IT infrastructure. For example, hardware switch settings or software settings may be associated with known vulnerabilities and/or risks to the information handled by the IT infrastructure. Similarly, the way in which IT components are interconnected may create vulnerabilities and/or risks to the information handled by the IT infrastructure.

Non-technology based information security elements can include information handling policies, procedures, training, and/or awareness. Information security handling policy generally refers to guidelines, instructions, rules, and/or regulations for handling information. Information security procedure generally refers to specific step-by-step instructions for implementing security handling policies. Information security policies and procedures tend to vary by enterprise type and by the type of information being handled.

Depending upon the context, information security policies may also refer to policies implemented within an IT infrastructure, such as firewall policies, for example. Vulnerability and risks associated with this category of information security, however, generally falls under the rubric of technology based vulnerabilities and risks, rather than non-technology based vulnerabilities and risks.

A fundamental goal of an information security policy is to communicate to everyone in an enterprise that information is a valuable asset to the enterprise and that everyone is responsible and accountable for protecting the information. A security policy is a visible representation of security considerations, requirements, priorities, assumptions, and responsibilities.

A security policy provides many benefits to an enterprise, including, without limitation:
- demonstrates management commitment to protecting enterprise information;
- provides cost benefit analyses of security measures to mange risk and protect enterprise assets;
- supports an enterprise's mission and goals and acts as an enabler for the enterprise;
- identifies what information must be protected;
- establishes who is responsible for protecting information;
- provides unambiguous expectations for employee conduct and responsibility;
- provides consequences of misuse;
- minimizes negative exposure to the enterprise by limiting liability, negative press, etc;
- guides product selection;
- ensures proper implementation of IT.

Security policies are developed by identifying information to be managed, determining the value of the information, determining the way the information is used, identifying who creates and uses the information, assessing risks to the information, and deriving requirements for protecting the information.

Information security can be compromised by deficiencies in IT infrastructure characteristics, components, configuration, connectivity, and/or architecture, and/or by deficiencies in information handling policies, procedures, training, and/or awareness.

In order to protect information, an information security assessment should be performed to identify any deficiencies in systems and/or processes. A proper information security assessment results in corrective measures and policy fixes that are appropriate for the types of information used by the enterprise, the way(s) in which the information is used, and the nature of the threats facing the information, and vulnerabilities associated with the systems and processes.

What is needed, therefore, is a system and method for assessing information security that takes into account technology based vulnerabilities and risks and non-technology based vulnerability and risks.

Information security vulnerabilities and risks vary by enterprise type. This is due, in part, to types of information handled by different types of enterprises, different types of threats faced by different types of enterprises, and/or different IT infrastructures. Thus, government enterprises, for example, may have different vulnerabilities and risks than commercial enterprises.

What is needed, therefore, is a system and method for assessing information security that takes into account an enterprise type, including consideration of any industry specific vulnerabilities and risks.

Within an enterprise, information needed to properly assess information security may not rest with a single individual or even within a single group of individuals. For example, IT information may be spread among multiple individuals or groups of individuals. The individuals or groups of individuals may be geographically diverse. For example, wide area network (WAN) knowledge might be with a WAN administrator, local area network (LAN) information might be with a LAN administrator. Other types of IT information might rest with one or more server administrators, IT supervisors, a CIO, etc.

Similarly, policies and procedures may vary within an enterprise depending upon the type of information being handled. For example, financial information, intellectual property information, human resource information, employee information, merger and acquisition information, regulatory information, and other types of information, may each have their own policy and procedure. Different individuals and/or groups of individuals may not be necessarily be aware of, or need to be aware of, policies and procedures outside of their respective areas of expertise.

What is needed, therefore, is a system and method for assessing information security that considers users' areas of expertise. Such a method and system should interview a plurality of users, based on each user's area(s) of expertise, to help insure that questions are answered accurately by qualified users, and to obtain an overall picture of information security within an enterprise.

An enterprise may define itself in terms of departments, subsidiaries, or other terms (generally, "domains"). Domains may be legally distinct domains or enterprise defined domains. domains may or may not be geographically based. Different domains within an enterprise may have similar and/or distinct information security issues to be addressed. For example, two or more domains within an enterprise may have substantially similar information security concerns, including technology based concerns and non-technology based concerns. On the other hand, two or more domains within an enterprise may have distinctly different information security concerns, including technology based concerns and non-technology based concerns.

What is needed, therefore, is a system and method for assessing information security that takes into account domains within an enterprise. Such a method and system should include a process for rolling-up information security information from various domains to perform an enterprise wide information security assessment.

SUMMARY OF THE INVENTION

The present invention is directed to a method, system and computer program product for assessing information security in an enterprise. Users are interviewed with questions designed to elicit deficiencies in information security, based on known weaknesses and/or vulnerabilities. In an embodiment, users are interviewed regarding information technology ("IT") infrastructure characteristics, components, configuration, connectivity, and/or architecture, and information handling policies, procedures, training, and/or awareness.

In an embodiment, users are interviewed based on areas of expertise, such as IT infrastructure areas of expertise.

In an embodiment, information security assessments are performed on domains within an enterprise, the results of which are roll-up to perform an information security assessment across the enterprise.

In an embodiment, the invention includes application specific questions and vulnerabilities, which permits a detailed assessment directed to known vulnerabilities associated with the application.

In an embodiment, the invention includes an application specific tailoring tool that allows a user to tailor the system to assess security of information handled by a third party application program.

In an embodiment, the invention includes industry specific questions and vulnerabilities. This permits a detailed assessment directed to known vulnerability and other issues associated with the various types of enterprise (e.g., government or commercial).

In an embodiment, the invention permits users to query a repository of expert knowledge.

In an embodiment, the invention provides users with working aids.

In an embodiment, the invention permits users to execute third party testing/diagnostic applications. The invention optionally combines results of the executed third party testing/diagnostic application(s) with user responses to interview questions. When the results are combined, security assessment is preferably based on both user responses and results of the executed third party testing/diagnostic application(s).

A system in accordance with the invention includes an inference engine, which may include a logic based inference engine, a knowledge based inference engine, and/or an artificial intelligence inference engine.

Further features and advantages of the present invention, as well as the structure and operation of various embodiments of the present invention, are described in detail below with reference to the accompanying drawings.

BRIEF DESCRIPTION OF THE FIGURES

The present invention will be described with reference to the accompanying drawings, wherein like reference numbers indicate identical or functionally similar elements. Also, the leftmost digit(s) of the reference numbers identify the drawings in which the associated elements are first introduced.

DETAILED DESCRIPTION

I. Introduction

Figure 1:
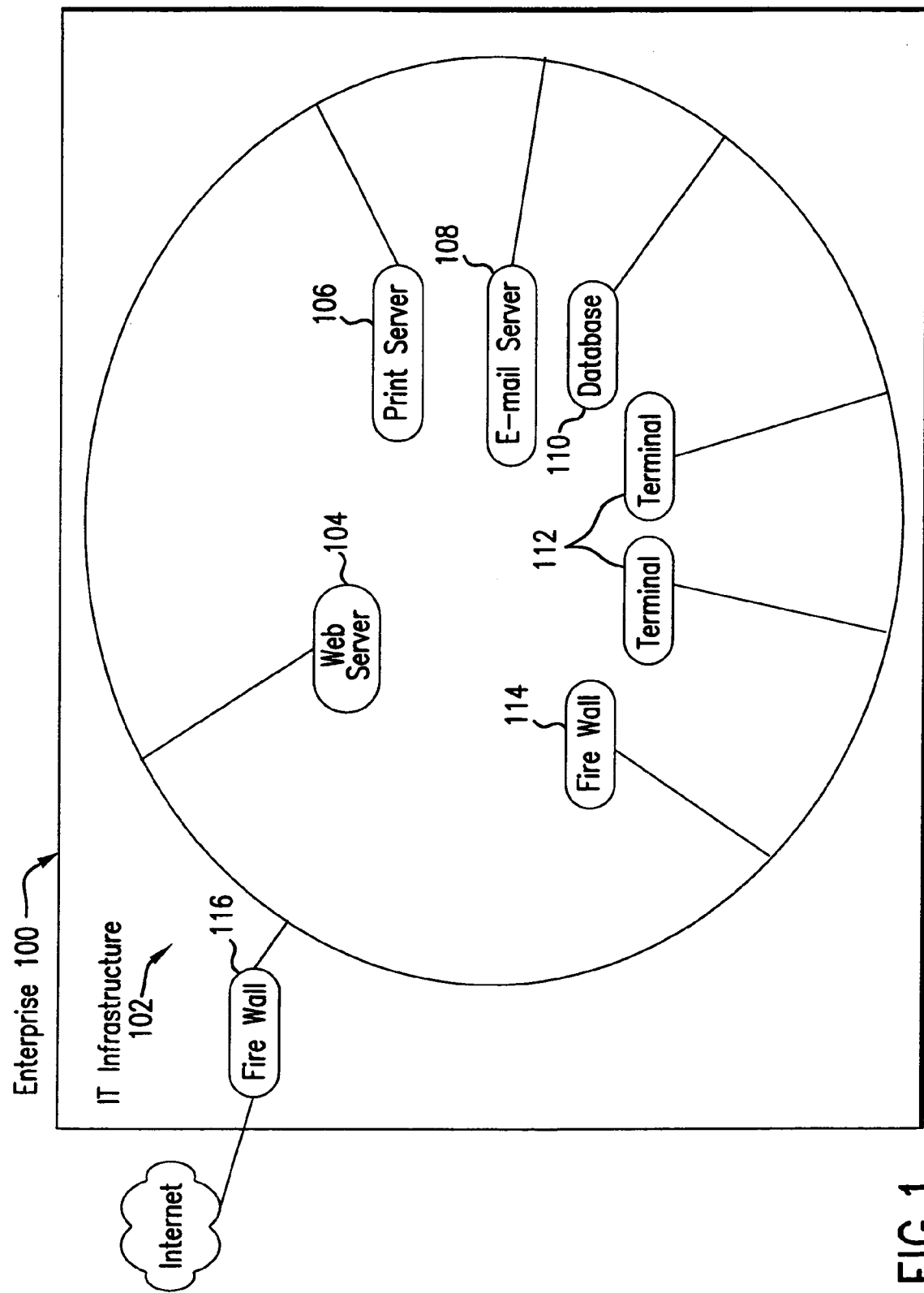
FIG. 1 illustrates an block diagram of an example IT infrastructure of an enterprise.

The present invention is directed to methods and systems for assessing information security.

In an embodiment, the present invention queries users with technology based questions and non-technology based questions. Technology based questions can include, without limitation, questions related to IT infrastructure components, configuration, and connectivity. Non-technology based questions can include, without limitation, questions related to information security handling policies, procedures, training, and/or awareness.

In an implementation of this embodiment, the present invention determines enterprise vulnerabilities and risks based on an integrated assessment of user responses to technology based questions and non-technology based questions. For example, one or more vulnerabilities and/or risks will depend upon user responses to both a technology based question and a non-technology based question.

However, the present invention is not limited to this embodiment. For example, one or more vulnerabilities and/or risks may depend only upon user responses to technology based questions. Similarly, one or more vulnerabilities and/or risks may depend only upon user responses to non-technology based questions.

In an embodiment, the present invention assesses information security based on an enterprise type, considering industry specific vulnerabilities and risks for the enterprise type.

In an embodiment, the present invention interviews users based on their areas of expertise. In this embodiment, the invention interviews users from multiple areas of expertise in order to obtain an overall information security assessment for the enterprise.

In an embodiment, the present invention assesses information security for domains within an enterprise. In an implementation of this embodiment, the invention includes a roll-up feature that assesses enterprise wide information security based on responses from users in the individual domains. In this mode, administrators across the enterprise will use the invention in each of the enterprise's constituent components. The results are then aggregated to identify security issues across the enterprise. This roll-up embodiment is useful as a building block of a larger assessment or policy development effort. In this embodiment, the invention can be implemented to develop an overall information security posture of an entire enterprise.

In an embodiment, the invention executes third party test/diagnostic/verification applications, such as CyberCop Scanner™, from Network Associates, McAfee or Symantec Antivirus, and ISS RealSecure™.

In an embodiment, the invention is implemented to assess security of information handled by a third party application, such as SAP and/or Oracle™, for example. In this embodiment, the invention includes application specific information, such as questions, vulnerabilities, instructions and/or code. Application specific information can be stored in one or more databases and/or other repositories of an information security tool kit.

In an embodiment, the invention includes a tool that allows users to generate and/or modify application specific information for the databases and other information repositories of an information security tool kit.

In an embodiment, the invention provides working aids, including, without limitation, working aids to assist users during interviewing, working aids to assist in understanding reports, and working aids to assist users in developing solutions, such as hot link working aids.

In an embodiment, the invention allows users to query a repository of information related to information security, IT infrastructure, or any other type of information embodied within a repository.

In an embodiment, the present invention is implemented with two or more of the above features. For example, in an embodiment, the present invention interviews a set-up administrator to determine an enterprise type, to associate individuals with areas of expertise, to determine whether any third party applications are involved, and/or to define domains within the enterprise. Based on responses from the set-up administrator, questions are selected from one or more pools of questions to interview users. Working aids are provided to the user, the user can query a repository of information, and the user can execute third party testing/diagnostic applications. Information security is assess based on user responses, results of any third party testing/diagnostic applications, and replies to any queries from the user.

In an embodiment, the present invention is implemented in a computer program.

The present invention can be implemented for use by administrators ("users") with little or no specialized information security expertise.

The invention includes a core set of tools that allow system administrators to conduct risk assessments of a network and applications running on the network, to test for compliance with security policies, and to write policies where required. The core set of tools interview one or more users. The core set of tools evaluates users responses and provides feedback. Optional tools allow a user to "query an expert" to gain insights and assistance in performing systems and security administration functions.

In an embodiment, the invention is implemented for a system administrator at a local areas network level. Database administrators, web administrators, or application administrators, such as those responsible for SAP™ for Oracle™, can also utilized the invention within their functional domains.

The invention can be implemented with various levels of complexity. For example, the invention can be implemented for conducting limited risk assessments and determining compliance with information security policies and procedures. In this embodiment, the invention identifies critical deficiencies and presents recommendations for correcting them.

In more complex implementations, the invention includes a knowledge base of information security expertise and a more sophisticated query capability. This permits system administrators to utilize the information security expertise what will otherwise be available only be employing expensive consultants. The knowledge base will be updated periodically to reflect newly identified vulnerabilities and information security practices. Other embodiments of the invention include plug-in modules for product specific network assessments and a variety of commercial tools that conduct active network scans and/or passive network monitoring.

Definitions of various terms and phrases used herein are now provided. Detailed descriptions of the present invention follow the definitions.

A. Definitions

For this specification, the following terms shall have the indicated meaning(s).

Enterprise shall mean any type of entity that utilizes information, including, without limitation, government enterprises, non-government enterprises, commercial enterprises, non-commercial enterprises, for-profit enterprises, and non-profit enterprises. Generally, when a single information security assessment is performed, the scope of the information security assessment defines the enterprise. Multiple assessments are discussed below with respect to domains.

Domain shall mean a group within an enterprise. When a plurality of security assessments are performed and the results are rolled up into an overall information security assessment, the scope of the overall assessment defines the enterprise, and the scope of each of the individual assessments defines a domain within the enterprise. Domains can include, without limitation, geographic domains, function domains, content domains, and administrative domains. Domains can overlap one another. For example, individuals and/or IT components can fall within more than one domain.

"Information" shall mean any information of an enterprise, technical and/or non-technical, including, without limitation:
  IT infrastructure information;
  human resources information;
  intellectual property information;
  enterprise security information;
  financial information;
  accounting information;
  customer information;
  vendor information;
  legal information;
  employee information;
  regulatory information;
  compliance information; and
  mergers and acquisition information.

"Information security" shall refer to security of any and/or all information of an enterprise, including that which is created, stored, moved within, and/or transmitted through IT assets of an enterprise (e.g., "electronic information"), and that which is not stored, moved within, and/or transmitted through IT assets of an enterprise.

"IT infrastructure" shall mean any and/or all hardware and/or software components related to storage, processing, and/or transferring of electronic information.

Vulnerability shall mean a weakness that could be exploited, intentionally or unintentionally. Weakness can include, without limitation, weaknesses in policies and/or procedures, bugs in operating system software, bugs in application software, and configuration mistakes. Vulnerability includes, without limitation, "threats" as described in various literature and/or U.S. Government regulations.

Threat, unless otherwise defined herein, shall mean any and all types of threats, and shall not be limited by any specific definition that may be used in the relevant art(s).

Risk, unless otherwise defined herein, shall mean any and all types of risks, and shall not be limited by any specific definition that may be used in the relevant art(s).

Deficiency shall mean technical and/or non-technical elements that reduce information security such as, for example, handling, set-up, and connectivity).

B. Example Environment

Information security within an enterprise has technical and non-technical aspects. Technical aspects include information technology infrastructure (i.e., technical characteristics, components, connectivity, and architecture). Non-technical aspects include information handling policies, procedures, training and awareness. Information security can be compromised by deficiencies in either aspect. For example, information security can be compromised by deficiencies in IT infrastructure and/or by an individual's lack of proper information handling training and/or awareness.

FIG. 1 illustrates an example enterprise 100 having an IT infrastructure 102. In the illustrated example, the IT infrastructure includes a web server 104, a print server 106, an e-mail server 108, a database 110, a plurality of terminals 112, an internal firewall 114, and an external internet firewall 116. IT infrastructure 102 is provided an example IT infrastructure. One skilled in the relevant art(s) will understand that an IT infrastructure does not require all of the illustrated components, and can include a variety of other components and configurations, including, without limitation, wide area networks (WANs), and local area networks (LANs).

Information security within enterprise 100 depends, in part, on the components that make up the IT infrastructure 102, their configuration, their connectivity with one another, and the overall architecture.

Information security within enterprise 100 also depends on information security handling policies, procedure, training and awareness. Typically, an enterprise will maintain some information within its IT infrastructure, some information outside of its IT infrastructure, and some information both within and outside of its IT infrastructure. Information maintained outside of an IT infrastructure may be maintained mentally by employees, and/or in a tangible media, such as in paper files, for example. Information security policies and procedures should take into account all types of information handled by an enterprise.

Figure 2:
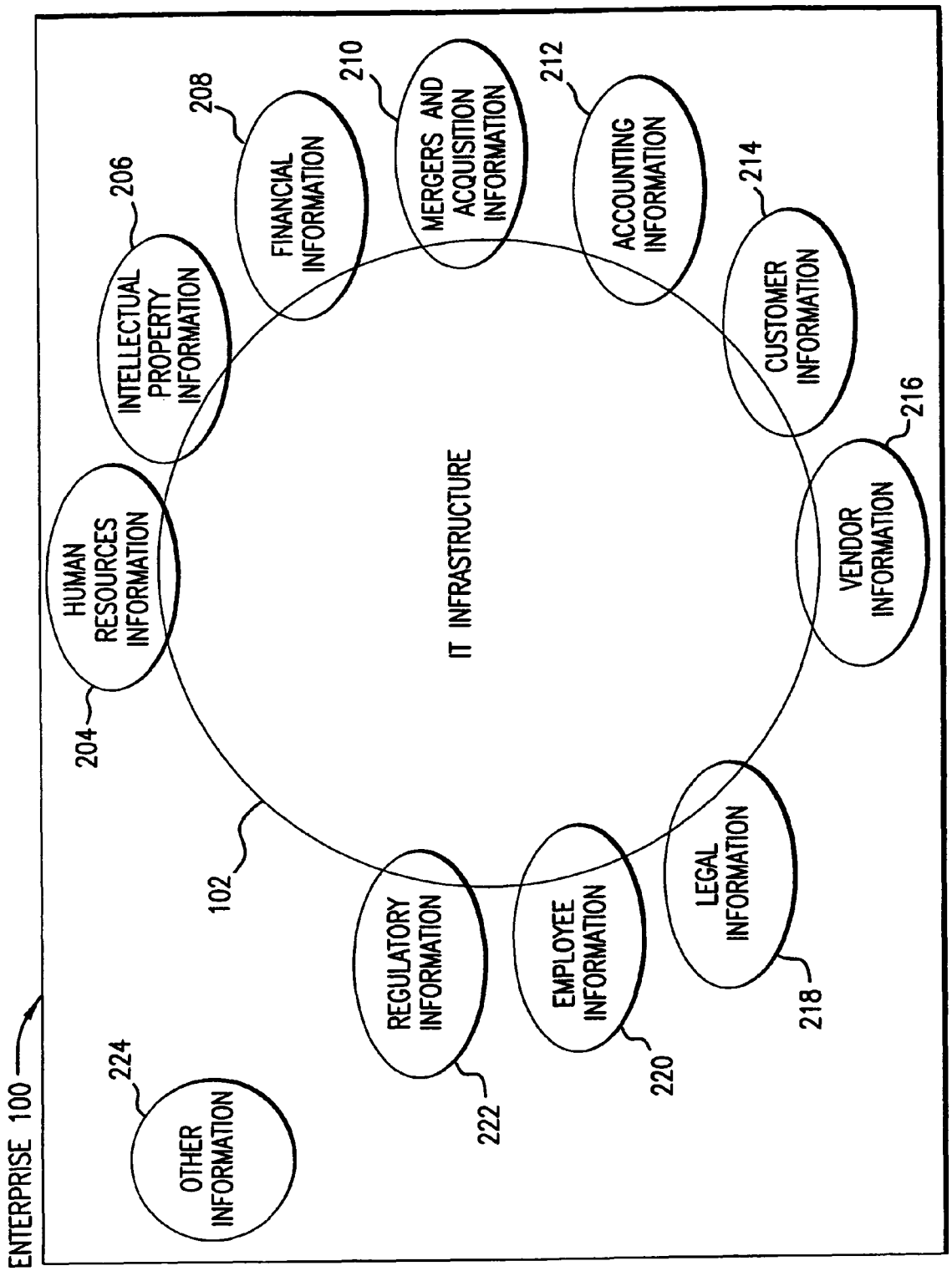
FIG. 2 illustrates an block diagram of various example types of information of an enterprise.

FIG. 2 illustrates example types of information that are typically utilized by an enterprise, such as enterprise 100. In this example, enterprise 100 includes a number of types of information contained partially or wholly within IT infrastructure 102, including:

human resources information 204;
    intellectual property information 206;
    financial information 208;
    mergers and acquisition information 210
    accounting information 212;
    customer information 214;
    vendor information 216;
    legal information 218;
    employee information 220; and
    regulatory information 222.

Information types 204-222 are for illustrative purposes only. Other types of information may also be used. Although information types 204-222 are illustrated as separate information types, two or more of information types 204-222 may overlap.

In the example of FIG. 2, the enterprise 100 also includes information outside of the IT infrastructure 202, illustrated as other information 224.

The security of information types 204-222 depend upon the characteristics of the IT infrastructure 102 and upon the policies and procedures for handling the information types 204-222. The policies and procedures for handling the information types 204-222 can include, without limitation, policies and procedures for human handling and policies and procedures implemented within IT infrastructure 102.

The security of other information 224 depends upon policies and procedures for human handling, but does not depend on IT infrastructure information security.

The present invention is a method and system for assessing information security of an enterprise, such as enterprise 100. Based on the teachings herein, one skilled in the relevant art(s) will understand how to implement the present invention for other types of enterprises as well.

In an embodiment, the invention assesses information security based upon IT infrastructure characteristics and information handling policies, procedure, knowledge, training, and awareness.

In an embodiment, the invention assesses information security based upon an enterprise type, considering industry specific vulnerabilities and risks.

In an embodiment, the present invention interviews users based upon the users' area(s) of expertise.

In an embodiment, the present invention is implemented for various domains within an enterprise. A roll-up feature assesses enterprise wide information security based on information security assessments for the domains.

In an embodiment, the invention interviews one or more set-up administrators prior interviewing users to determine the type and/or structure of an enterprise and to selects questions appropriate for the enterprise.

The invention optionally includes one or more of a number of optional features described below.

II. Methods for Assessing Enterprise Information Security

The present invention is now described in terms of a process. Example methods for implementing the process are provided for illustrative purposes only. Based on the teachings herein, one skilled in the relevant art(s) will understand that the present invention can be implemented with other methods as well, which are within the scope of the present invention.

Figure 3:
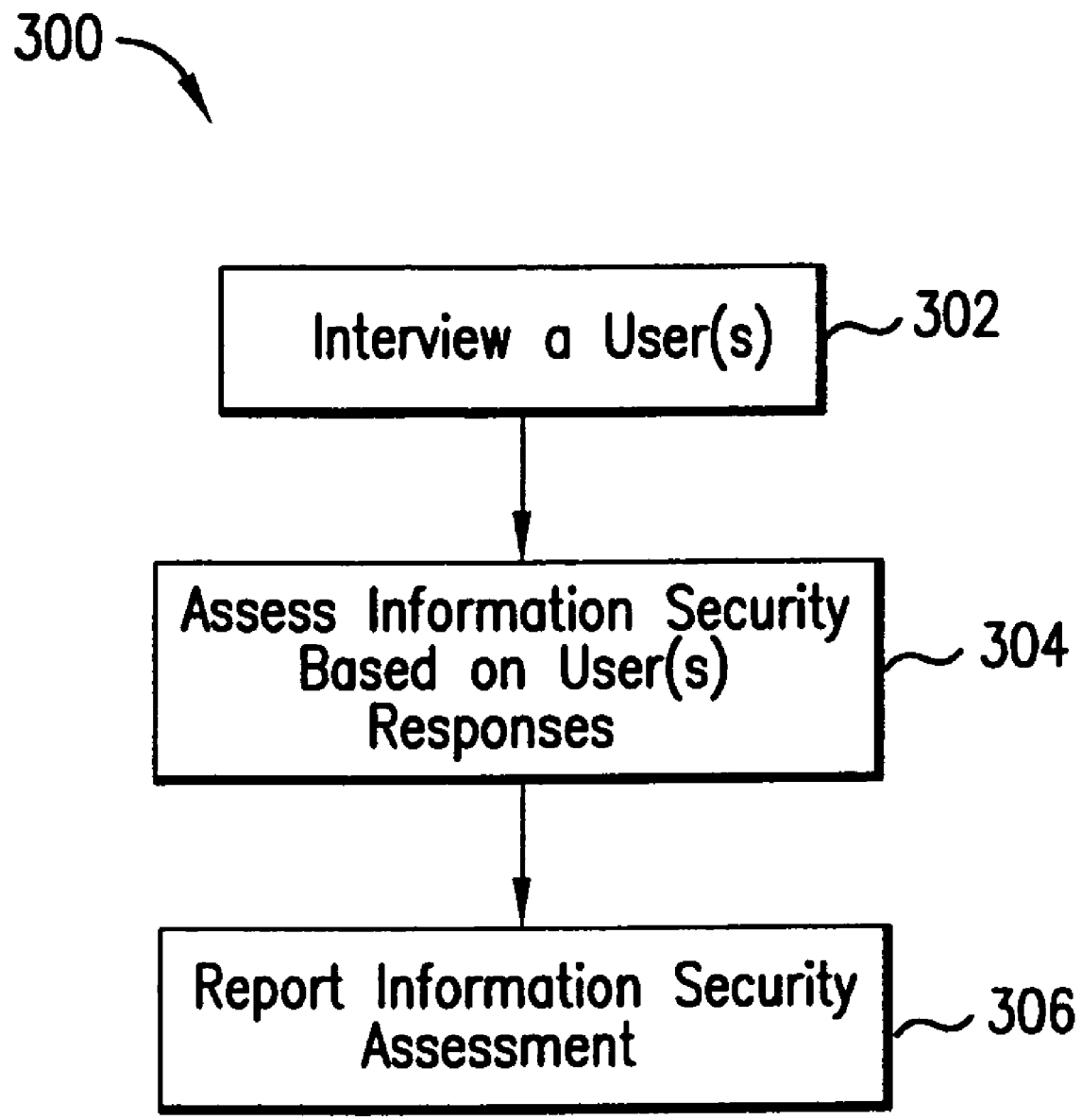
FIG. 3 illustrates a high level process flow chart of a method for assessing information security, in accordance with the present invention.

FIG. 3 illustrates a high level process flow chart 302 of the present invention. The process begins at step 302, interviewing user(s). Details and example implementations of interviewing users are provided below.

Processing proceeds to step 304, assessing information security based on user(s) responses. Details and example implementations of assessing information security are provided below.

Processing then proceeds to step 306, reporting the information security assessment. Details and example implementations of reporting information security assessments are provided below.

A variety of optional start-up processes and/or initialization processes can be implemented as part of step 302. Example optional start-up processes and/or initialization processes are now presented.

A. Process Start-Up

In an embodiment, upon execution of the process, a user is prompted to provide identification information (e.g., user ID and password).

Upon successful login, the user is provided with one or more options, including, without limitation, starting a new assessment, initializing an assessment (described above), continuing with a previously started assessment, query an expert (described below), and/or executing third party testing/diagnostic applications.

In an embodiment, one or more user options are available to the user throughout the assessment process. For example, where the process is performed under control of a multitasking operating system, a user may be permitted to query an expert during an assessment interview, and/or executing third party testing/diagnostic applications.

Figure 4:
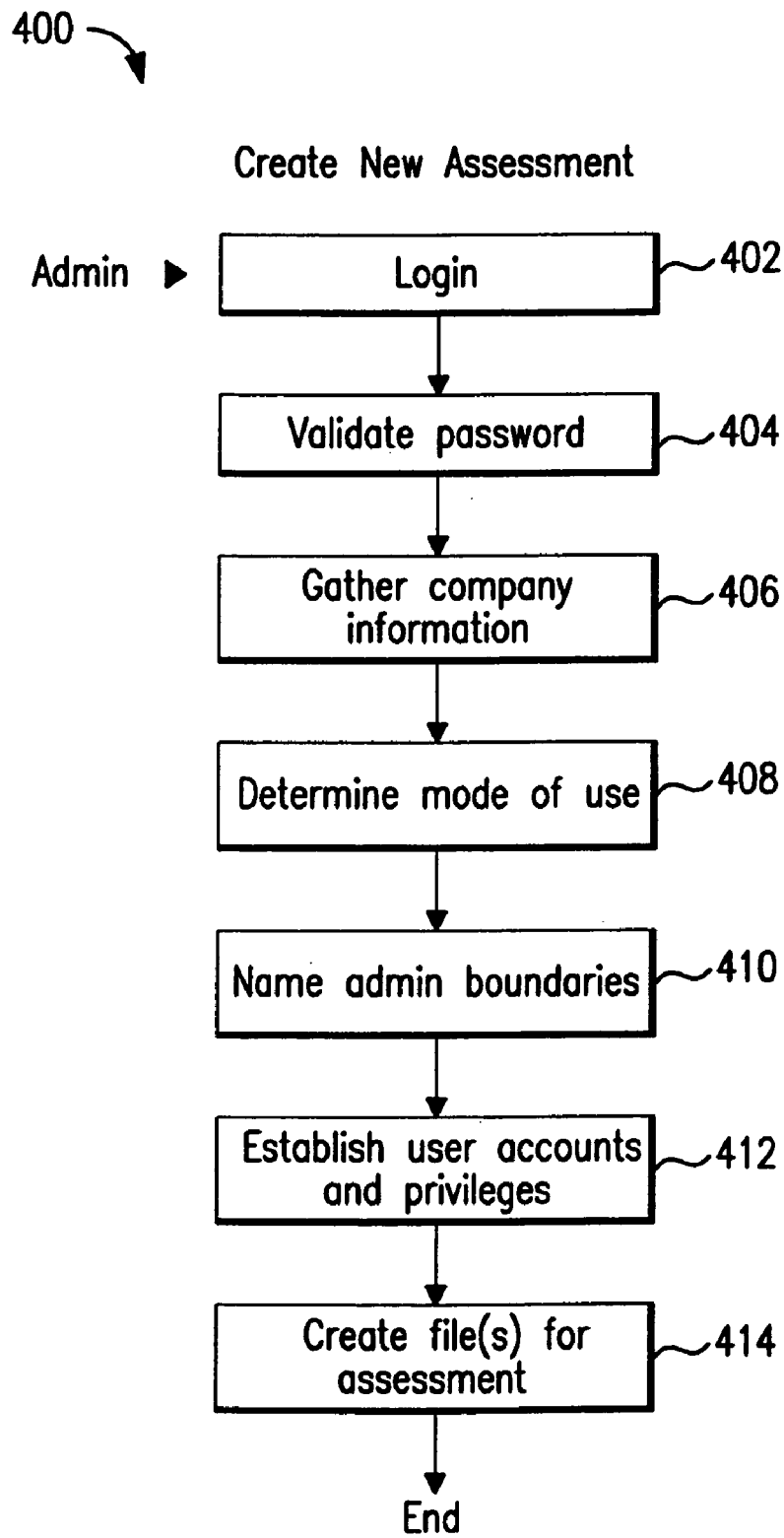
FIG. 4 illustrates a process flow chart of an example start-up process, in accordance with the present invention.
Figure 5:
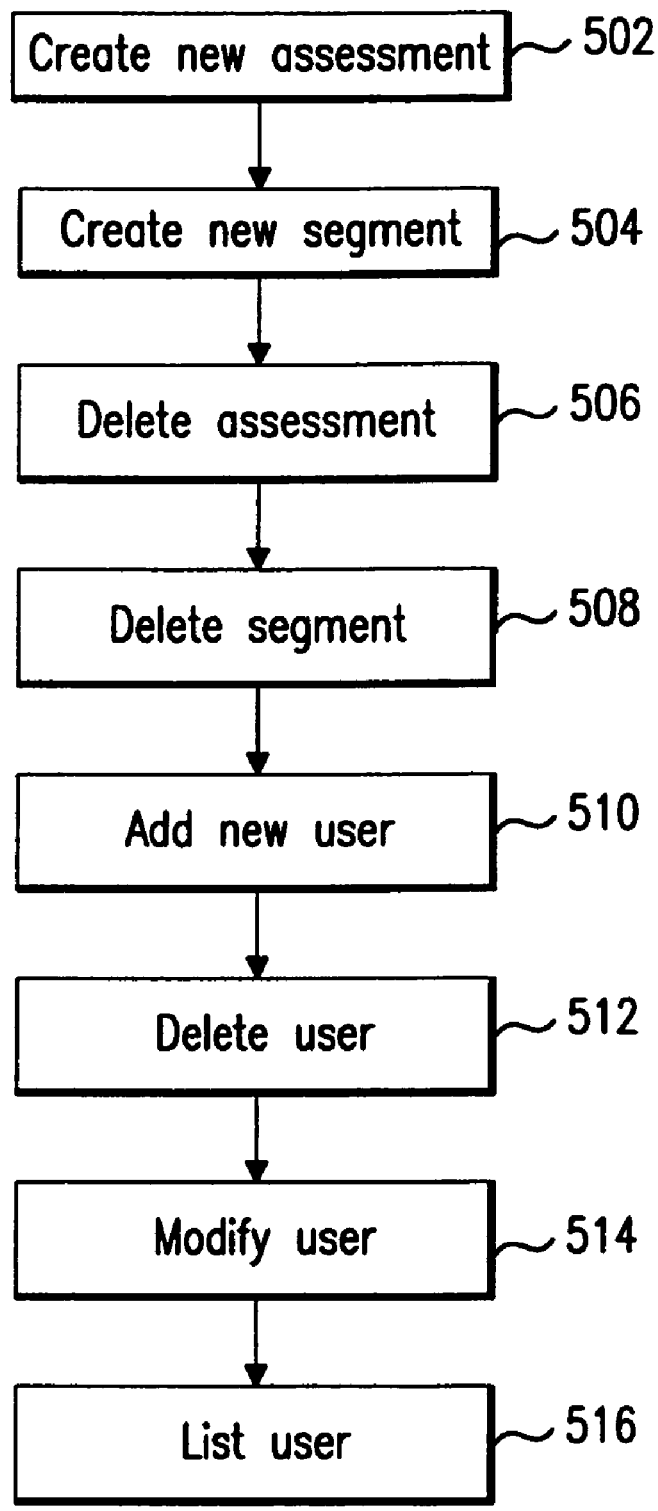
FIG. 5 illustrates a process flow chart of an example start-up process, in accordance with the present invention.

In FIG. 4, steps 402 and 404 illustrates example process start-up procedures FIG. 5 shows additional options that can be presented to the user.

B. Initialization

In an embodiment, step 302 includes an optional initialization process that allows a set-up administrator to configure the process for enterprise particulars. For example, the optional initialization procedure can include querying a set-up administrator to tailor questions according to an enterprise type (described below), to tailor questions according to user areas of expertise (described below), to tailor questions for domains and roll-up (described below), and/or combinations thereof. These options are illustrated at a high level in steps 406-412 of FIG. 4, and are described below.

C. Interviewing Users

Referring back to FIG. 3, in an embodiment of step 302 a single user is interviewed. This may be the case for small enterprises where a single person has the necessary knowledge to answer questions posed during the interviewing process. This may also be the case where a limited assessment is being conducted.

In an alternative embodiment of step 302, multiple users are interviewed. This may be the case where multiple users have information that would be useful to an information security assessment. In a multiple user embodiment, user interviews can be tailored according to users' areas of expertise. This is described below.

In an embodiment of step 302, users are interviewed with questions presented on a display under control of a computer. In this embodiment, users answer questions by entering them into the computer. In an embodiment, users provide answers by typing them on keyboard or other input device. In another embodiment, users may select an answer from a list of acceptable answers.

In an alternative embodiment, users are interviewed with computer controlled audible questions. In this embodiment, users may provide answers as described above or verbally.

In another alternative embodiment, users are interviewed verbally by a human.

In an embodiment, the process includes a plurality of question pools from which questions can be selected. In an embodiment, the process accommodates the addition of new question pools as they become available.

1. Interviewing Users with Technology and Non-Technology Questions

In an embodiment of step 302, interviewing questions are directed to technical issues, such as, without limitation, IT infrastructure characteristics, components, configuration, connectivity, and/or architecture.

In an embodiment of step 302, interviewing questions are directed to non-technical issues, such as, without limitation, information handling policies, procedures, training, and/or awareness, enterprise type, and/or user area of expertise.

In an embodiment of step 302, interviewing questions are directed to both technical issues and non-technical issues.

Two examples of technical and non-technical interviewing questions are provided at the end of this specification. Some of the example questions are presented with example working aids that provide explanations and/or definitions to assist a user in answering questions. These examples are provided for illustrative purposes only. Other questions can be posed to uses to identify deficiencies, vulnerabilities and risks.

2. Interviewing Users Based on Type of Enterprise

Information security issues can vary according to the type of enterprise. For example, and without limitation, issues can include the type(s) of information handled by the enterprise, the importance of the information, the nature and extent of information security policies associated with the information, the types of IT infrastructure utilized by the enterprise, the layout or organization of the enterprise, and the nature of potential threats to the enterprise and its information.

Government enterprises, for example, typically have information security concerns different from and/or in addition to concerns of non-government enterprises. Information security concerns can vary among different types of government enterprises. As a result, different government enterprises may be subject to different compliance criteria. Certain government enterprises may have special security concerns because of their location or the nature of the work. For these reasons, the U.S. Government promulgates compliance criteria for different types of government enterprises. For example, current U.S. Government compliance criteria include, without limitation, Department of Defense Information Technology Security Certification Accreditation and Process ("DITSCAP") and National Security Agency Information Security Assessment Methodology ("NSA IAM").

Thus, in an embodiment of the invention, the process interviews users based on an enterprise type. In an implementation, the process selects questions from one or more pools of questions, depending upon an enterprise type. The one or more pools of questions include questions directed to industry specific vulnerabilities and/or risks.

Figure 7:
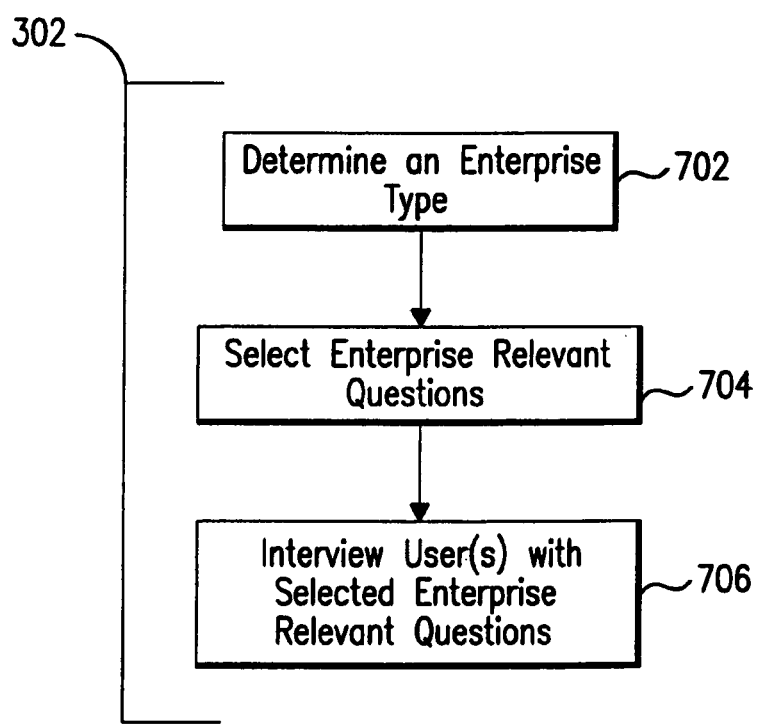
FIG. 7 illustrates a process flow chart of an example initialization and interviewing process, in accordance with the present invention.

FIG. 7 illustrates an example process flow chart 700 for implementing step 302. The process begins at step 702, determine an enterprise type. In an embodiment, step 702 is performed by interviewing one or more users, which may be one of the users interviewed in step 706 or may be a different user, such as a set-up administrator. In an alternative embodiment, step 702 is performed without user input, for example, by interfacing with the IT infrastructure and accessing information that identifies the enterprise type.

Processing then proceeds to step 704, select enterprise relevant questions. Enterprise relevant questions can be selected in any of a variety of ways. In an embodiment, questions are stored in a database with an indication as to the type of enterprise to which they pertain. In some cases, a question will pertain to more than one type of enterprise. In an alternative embodiment, separate databases of questions are maintained for different types of enterprises.

Processing then proceeds to step 706, interview user(s) with the selected enterprise relevant questions.

Figure 8:
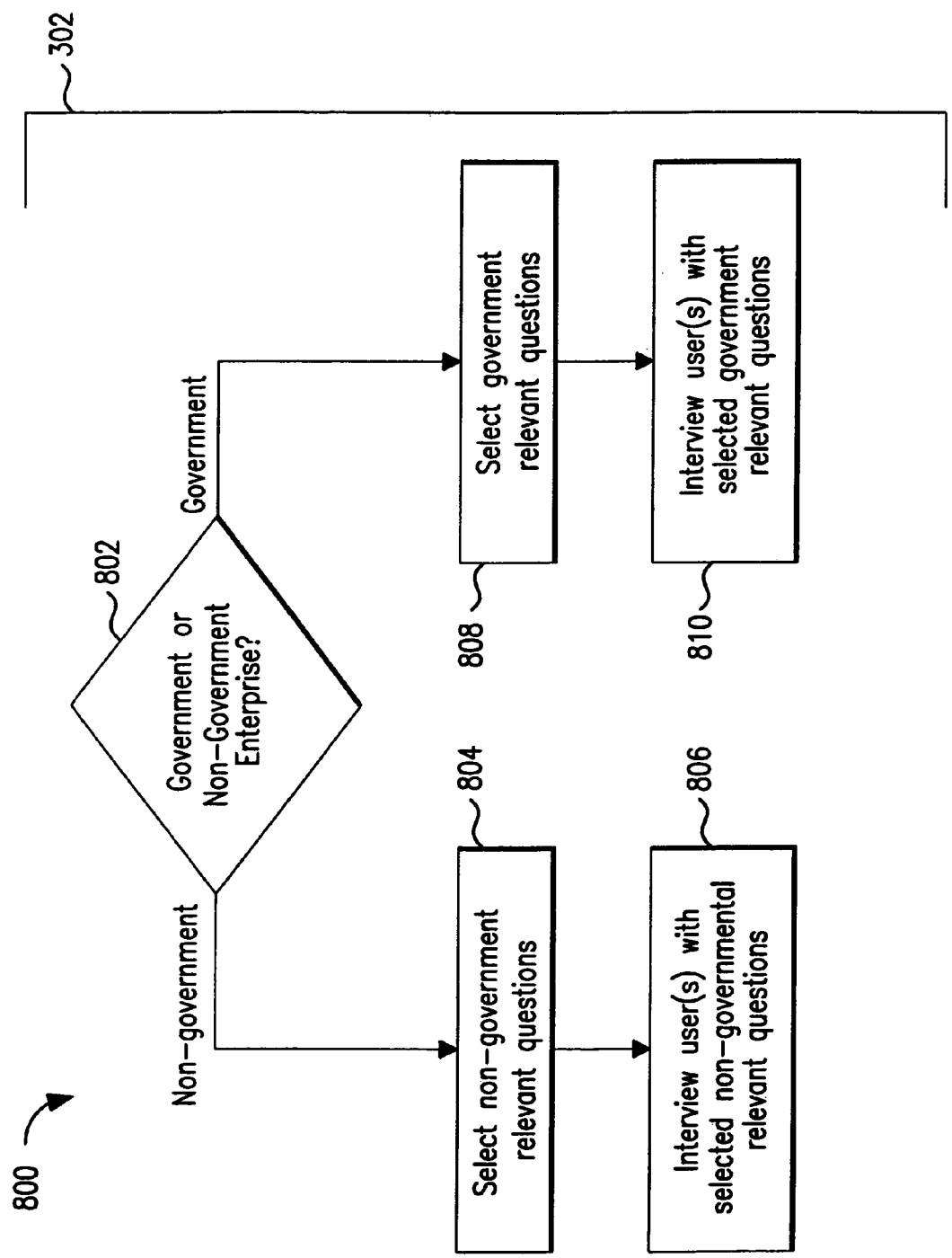
FIG. 8 illustrates a process flow chart of an example initialization and interviewing process, in accordance with the present invention.

FIG. 8 illustrates another example process flow chart 800 for implementing step 302. The process begins at step 802, determine whether the enterprise is a government enterprise or a non-government enterprise. Step 802 can be performed by interviewing a user or automatically, as described for step 702.

From step 802, if the enterprise is a non-government enterprise, processing proceeds to step 804, select non-government relevant questions, followed by step 806, interview user(s) with the selected non-government relevant questions. If the enterprise is a government enterprise, processing proceeds from step 802 to step 808, select government relevant questions, followed by step 810, interview user(s) with the selected government relevant questions.

Figure 9:
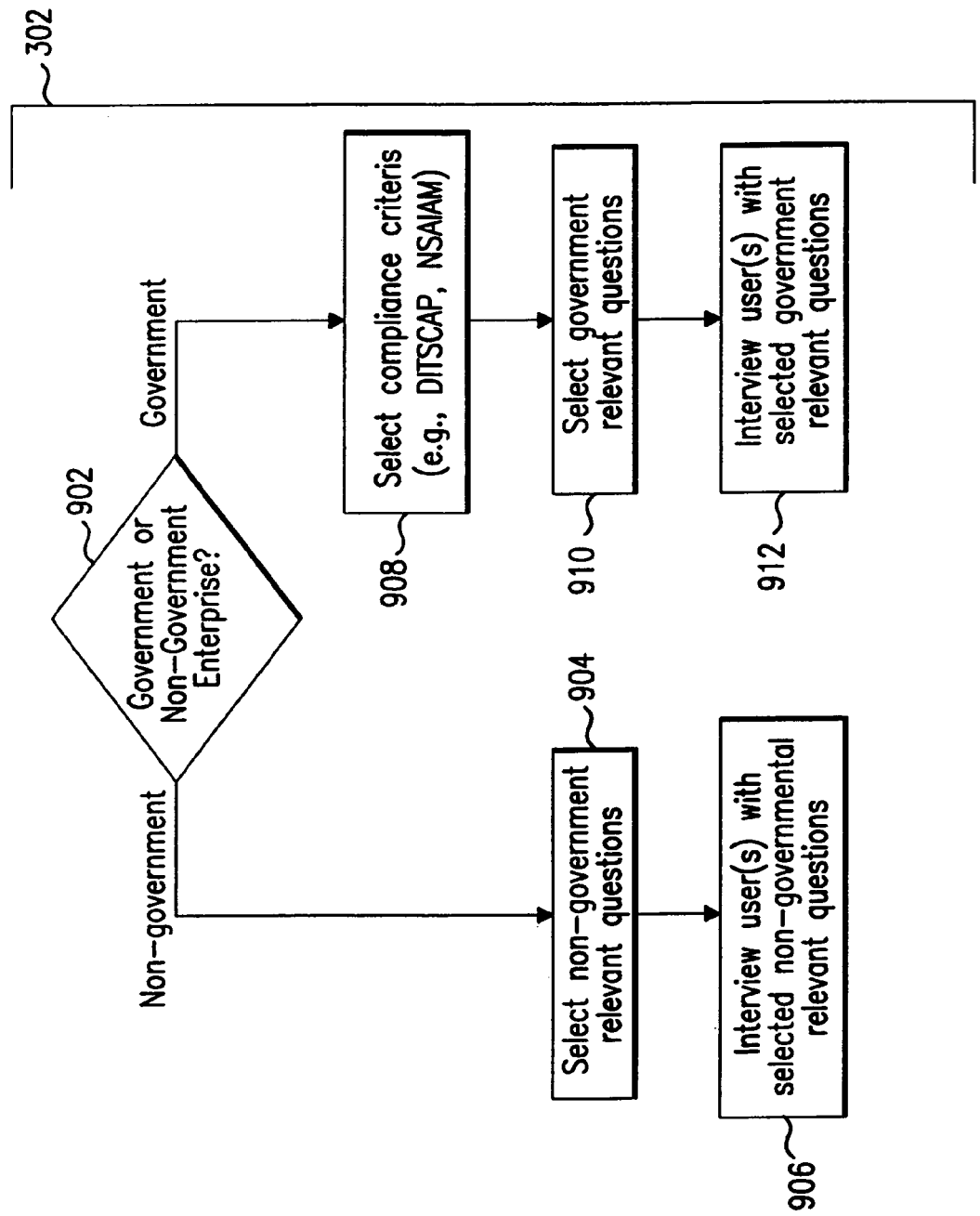
FIG. 9 illustrates a process flow chart of an example initialization and interviewing process, in accordance with the present invention.

FIG. 9 illustrates another example process flow chart 900 for implementing step 302. The process is similar to the process 800, with the additional of step 908, select compliance criteria, followed by step 910, select questions relevant to the selected compliance criteria.

The examples herein are provided for illustrated purposes only. The invention is not limited to the examples herein. Based on the teachings herein, one skilled in the relevant art(s) will understand that the present invention can be implemented to interview users with enterprise specific questions for other types enterprises and/or compliance criteria as well.

3. Interviewing Users Based on Areas of Expertise

Figure 10:
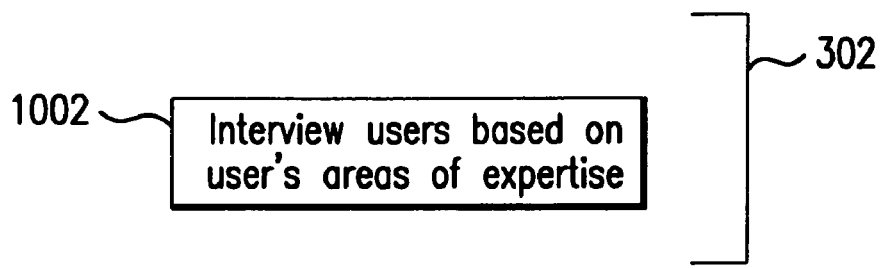
FIG. 10 illustrates an example interviewing step for interviewing users based on areas of expertise, in accordance with the present invention.
Figure 11:
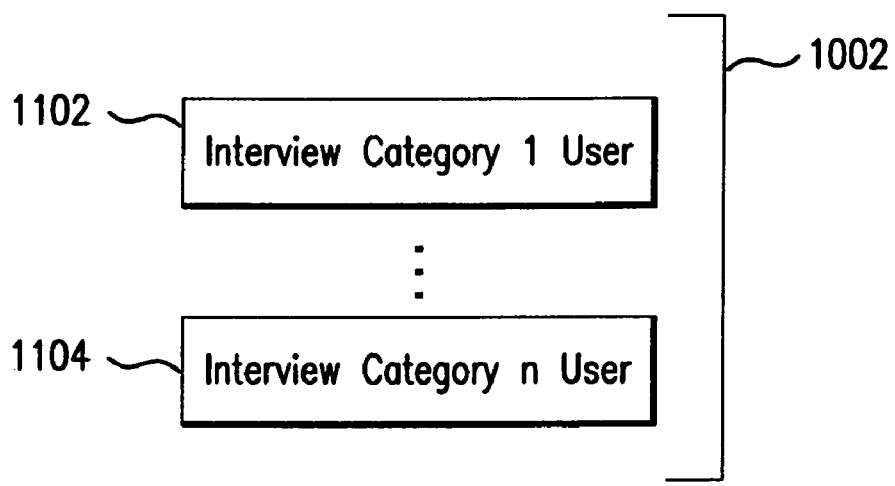
FIG. 11 illustrates an example process flow chart for interviewing users based on areas of expertise, in accordance with the present invention.

In an embodiment, users are interviewed according to their respective areas of expertise, as illustrated in FIG. 10, for example, where step 302 is illustrated as step 1002, interviewing users based on users' areas of expertise. This permits the process to conduct more in-depth interviews of users than might otherwise be possible. This also help the process to avoid asking questions of a user for which the user is not qualified to answer, and thus helps to insure accuracy of information obtained by the process. Step 1002 is illustrated in slightly more detail in FIG. 11 as steps 1102-1104.

In an embodiment, questions are simply presented in groupings associated with areas of expertise, with no attempt to associate groupings with particular users. In an alternative embodiment, a set-up administrator is permitted to assign specific users and/or groups of users to one or more groups of questions.

Figure 12A:
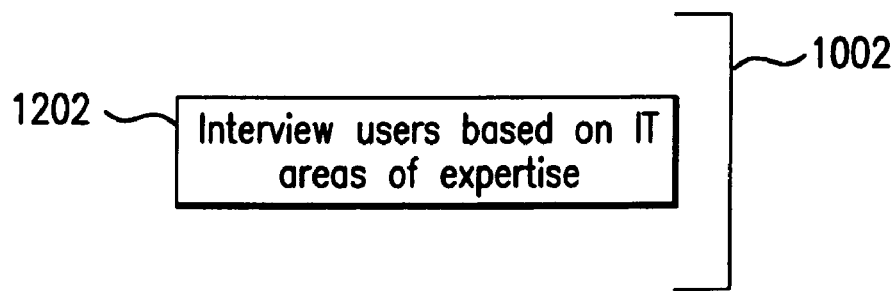
FIG. 12A illustrates an example process flow chart for interviewing users based on IT areas of expertise, in accordance with the present invention.

FIG. 12A illustrates step 1002 as step 1202, interviewing users based on IT areas of expertise. In an embodiment, the users are administrators or supervisors of various IT areas of expertise.

Figure 12B:
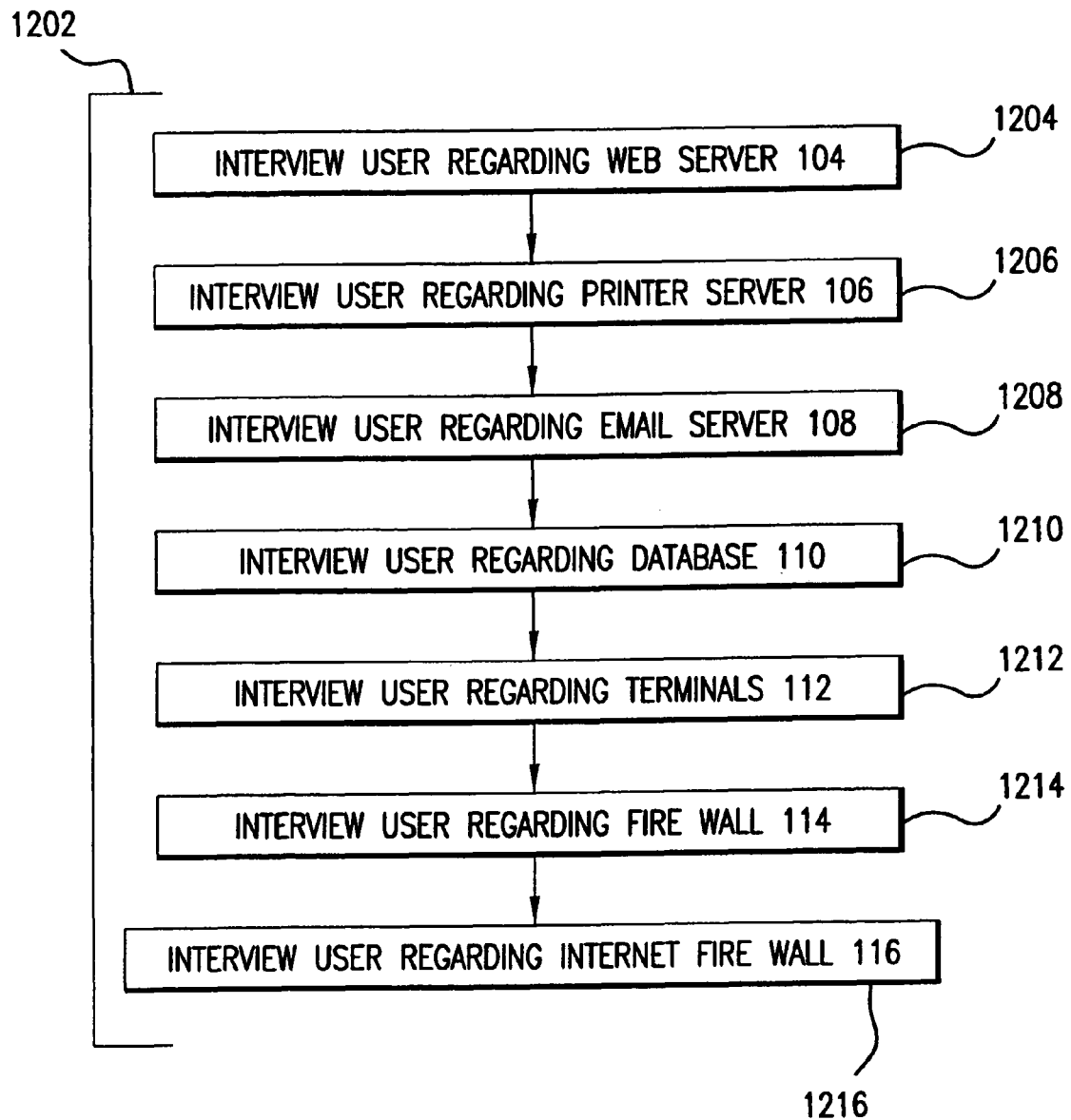
FIG. 12B illustrates an example process flow chart for interviewing users based on IT areas of expertise, in accordance with the present invention.

FIG. 12B illustrates step 1202 for the example IT infrastructure 102 illustrated in FIG. 1. In step 1204, a user is interviewed regarding web server 104. In step 1206, a user is interviewed regarding printer server 106. In step 1208, a user is interviewed regarding email server 108. In step 1210, a user is interviewed regarding database 110. In step 1212, a user is interviewed regarding terminals 112. In step 1214, a user is interviewed regarding fire wall 114. In step 1216, a user is interviewed regarding internet fire wall 116. Additionally, a user can be interviewed regarding wide area networks (WANs), local area networks (LANs), overall policy and architecture.

In the example of FIG. 12B, one or more of the groups of questions can be presented to the same user or group of users.

Similarly, one or more groups of questions can be presented to different users or groups of users.

In an embodiment, the interviews include both IT infrastructure questions and policy questions.

Users may also be interviewed based on other information areas of expertise, such as the areas of information illustrated in FIG. 2.

The example areas of expertise described herein are provided as illustration only. The present invention can be used to interview users based on other areas of expertise as well.

In an embodiment, a user's area of expertise is determined in advance during an optional initialization process, described above. Optionally, a user verification process—i.e., user identification and/or password—is utilized to insure that only predetermined users are interviewed.

Alternatively, or in combination with the above, questions are posed to a user at the time of interviewing to determine and/or verify the user's expertise.

4. Interviewing Users Based on Enterprise Type and Area of Expertise

In an embodiment, the process interviews multiple users based on the type of enterprise and the users' areas of expertise.

5. Working Aids

In an embodiment, working aids are provided to users. Working aids can be provided in a number of contexts and for a number of purposes. Working aids can include, without limitation, advice on information security considerations of installing or configuring components, explanations of why certain policy issues are important and possible consequences of not addressing them, definitions, and general reference material, including hot links.

Working aids are provided during the interviewing process of step 302 to assist in answering questions, for example. Working aids can also be provided with reports in step 306 to assist readers in understanding the reports. Working aids can also include working aids to assist users in developing solutions. For example, by suggesting one or more possible solutions and providing additional information to assist the user in deciding which solution is appropriate for the enterprise.

Working aids are provided in any of a variety of formats. In an embodiment, when a user is interviewed via a display terminal, availability of a working aid is indicated to the user with a special font, highlighting, or any other suitable display formatting technique. In this embodiment, the user can "click" or otherwise indicate that the available working aid is desired. The process will then provide the working aid.

Alternatively, working aids are presented automatically whenever appropriate.

6. Dynamic Interviewing—Question Dependencies

In an embodiment, the interviewing process is dynamic in that questions posed to a user can depend upon one or more prior answers from the user and/or from another user. This allows the process to ask additional information in areas where it might lead to a more thorough information security assessment. For example, if a user has additional information that could be useful, it would be prudent for the process to continue interviewing the user until the user's knowledge is exhausted.

Question dependencies can be utilized for example, when an answer to a question, or to a group of questions indicates a vulnerability or a potential vulnerability. Further questions and user responses may clarify the potential vulnerability or eliminate the concern.

Question dependencies also allow the process to cut short a line of questions that may not be relevant to the situation or to the user. For example, if a user indicates that he/she has no knowledge of a particular line of questioning, it would be pointless to ask additional details.

Question dependencies can be implemented, for example, as a nested loop of questions, whereby, when the nested loop of questioning ends, interviewing continues from where the nested loop began.

Question dependencies can also be implemented as a jump to another line of questioning, where interviewing may or may not return to the prior line of questioning.

D. Assessing User Responses

Referring back to FIG. 3, after step 302, the process proceeds to step 304, assessing information security based on users responses. Step 304 preferably analyzes user responses to questions in conjunction with known vulnerabilities and/or other considerations associated with IT infrastructure characteristics, components, connectivity, and/or architecture, and/or policy and/or procedures. Such vulnerabilities and/or other considerations can be obtained from a variety of sources including, without limitation, prior experience, product bulletins, research, reverse engineering, and web postings. Generally, as more sources are consulted, more vulnerabilities and/or other considerations are identified.

Questions posed to users during step 302 are designed to elicit information from users necessary to determine which, if any, of the vulnerabilities and/or other considerations apply to an enterprise. The questions posed to users are preferably developed by persons having knowledge of the vulnerabilities and/or other issues.

Step 304 outputs deficiency statements based on the analysis of user responses, vulnerabilities and/or other considerations. Deficiency statements can be directed to technical and/or non-technical issues. Deficiency statements can include, without limitation, lists of identified vulnerabilities, deficiencies, critical deficiencies, and risks. Example embodiments of this process are described below. Deficiency statements can also include suggested corrective actions. Other example types of deficiency statements are found throughout this specification.

1. Logic Based Assessment

In an embodiment, step 304 is performed by outputting information security deficiency statements that are associated with answers to one or more questions. This embodiment is referred to as logic based assessment.

For example, in some situations, the answer to a single question may indicate a deficiency (e.g., a vulnerability or risk, a lack of a relevant information security policies, lack of knowledge of a relevant information security policies, failure to follow an established information security policies, etc.). In other cases, however, a deficiency may depend upon answers to a series or group of related or unrelated questions. In other situations, a deficiency may be indicated by similar or conflicting answers to the same question or group of questions by multiple users.

Example systems for implementing logic based assessments are described below.

Information security deficiency statements can take many forms and can be directed to technology based deficiencies (e.g., deficiencies in IT infrastructure characteristics, components, configuration, connectivity, and/or architecture) and/or to non-technology based deficiencies (e.g., policies, procedure, training and/or awareness).

In an embodiment, step 304 includes prioritizing deficiencies.

In an embodiment, step 304 includes identifying critical deficiencies.

In an embodiment, step 304 includes identifying deficiencies in a local computing environment that require immediate attention, with or without recommended actions.

In an embodiment, step 304 includes identifying deficiencies in a local computing environment that require further analysis.

In an embodiment, step 304 includes generating a policy statement.

In an embodiment, step 304 includes generating a new policy statement. In an embodiment, step 304 includes generating a revised policy statement.

In an embodiment, step 304 includes generating a combination of two or more of the above example embodiments.

2. Expert Knowledge Based Assessments

In a embodiment, step 304 is performed with an expert (knowledge based) system in which knowledge from human subject-matter experts is encoded into a software program in such a way that the coded logic of the software program provides a searchable repository of this subject-matter knowledge. The expert system is encoded in such a way as to accept input and make inferences based on the implications of that input that a human subject-matter expert would normally be expected to make but which were not specifically encoded in the expert system.

3. Artificial Intelligence Based Assessments

In an embodiment, step 304 is performed with artificial intelligence (AI), such that input data is subjected to analysis by AI, and the problem solving methods and/or analysis and/or other tasks for which the AI is designed is modified by the AI itself as a result of the output of previous processing cycles.

4. Comparisons with Prior Assessments

In an embodiment, the present invention performs comparisons with prior information security assessments.

In an embodiment, comparisons with prior information security assessments are performed using current reports and prior reports.

In another embodiment, comparisons with prior information security assessments are performed using current analysis results and prior analysis results.

In another embodiment, comparisons with prior information security assessments are performed using current raw data and prior raw data.

In an embodiment, users can select among two or more of the above options when comparing information security assessments.

E. Reporting Information Security Assessment

In an embodiment, step 306 generates and stores one or more pre-formatted reports. Reports can include, without limitation, critical deficiencies requiring immediate attention, deficiencies requiring further analysis, and/or enterprise-wide critical deficiencies.

Report information can include, without limitation, one or more of the following types of information:
  scope of report (e.g., computing environment that was subject to the assessment, e.g, domain, organizational component);
  date of assessment;
  names of servers;
  names of LANs;
  version of process/software/took kit used for interviews/assessment;
  version of tool kit modules and plug-ins used;
  versions of third party software tools executed (active or passive);
  user queries;
  versions of question pools (including application specific question pools);
  versions of vulnerability and risk pools used;
  version of policy module used.

The various modules referred to above are described below in the description of a system for assessing information security.

In an embodiment, information is inserted into one or more standardized reports templates. Standardized report templates can include, without limitation:
  risk assessment of local computing environment;
  deficiencies in local environment requiring immediate attention;
  deficiencies in local environment that require further analysis;
  deficiencies that must be escalated for enterprise-wide analysis and resolution;
  information security policy for local computing environment;
  measure of enterprise conformance to the information security policy;
  measure of overall security posture of the enterprise;
  measure of the effectiveness of enterprise-wide security training and awareness programs; and
  list of most serious information security problems facing the enterprise.

In an embodiment, upon a user command, a pre-formatted report is output. Alternatively, a user can be permitted to generate a report to include one or more user-selected report templates.

In an embodiment, a user determines where a report will be output (e.g., to a display, a printer, or to an I/O device for forwarding to another device).

F. Multiple Domain and Roll-Up Features

In an embodiment, the present invention can be configured to assess information security for one or more domains within an enterprise, and to assess information security across the entire enterprise based on the security assessments from the totality of individual domains.

In an embodiment, a separate instance of the process 300 is implemented for each domain, and the results are analyzed to assess information security for the enterprise. See FIG. 18, for example.

In an embodiment, reports from individual domains are used to assess enterprise-wide information security.

In another embodiment, analysis results from individual domains are used to assess enterprise-wide information security.

In another embodiment, raw data (i.e., user(s) responses from individual domains) is used to assess enterprise-wide information security.

In an embodiment, users may select among two or more of the above options when assessing enterprise-wide information security.

G. Querying an Expert

The present invention optionally includes a "query an expert" feature that allows users to query a repository of information related to information security, IT infrastructure, or any other type of information embodied within a repository.

In an embodiment, upon start-up, the user is prompted to select between performing an information security assessment and the optional query an expert feature. Alternatively, the optional query an expert feature is available at any time to the user. This can be implemented, for example, when the process of interviewing a user and the optional initialization process are performed under a multi-tasking operating system.

The process is preferably designed to permit updating of the repository of information.

H. Execution of Third Party Testing/Diagnostic Programs

In an embodiment, the present invention permits a user to execute a third party testing and/or diagnostic program, such as, for example, a program that actively probes an IT infrastructure or component(s) thereof, or one that passively monitors network activity.

In an embodiment, the process analyzes results of the third party program in conjunction with responses from users. For example, a vulnerability may depend upon a user response and test results. Alternatively, the process analyzes results of the third party program independent of responses from users. Alternatively, the present invention does not analyze results of third party testing/diagnostic program.

In an embodiment, test results are used to select one or more questions for interviewing users in step 302.

I. Assessments Directed to Third Party Application Programs

In an embodiment, the present invention interviews users with questions developed for one or more particular third party application programs. This is useful where a significant part of an enterprise's information is maintained under or as a part of a particular third party application program. For this embodiment, questions are designed to address IT infrastructure and/or policy issues associated with the third party application(s).

In an embodiment, this optional feature is selected and/or initialized during the optional initialization process.

In an embodiment, the invention is implemented to assess security of information handled by a third party application, such as SAP and/or Oracle™, for example. This can include provision of application specific information, such as questions, vulnerabilities, instructions and/or code. Application specific information can be stored in one or more databases and/or other repositories of an information security toolkit.

In an embodiment, the invention includes an application specific tailoring tool that allows users to generate and/or modify application specific information for the databases and/or other information repositories of an information security tool kit. In operation, the tool queries one or more users having knowledge of a third party application and knowledge of problem-solving methodologies employed by the enterprise for conducting information security assessments and evaluations.

For example, the tool may present a graphical depiction of sequential problem-solving steps to the user(s) and prompt the user(s) to rearrange the sequential problem-solving steps to correspond to the method that the enterprise uses to conduct information security assessments and evaluations.

In addition to capturing the method(s) by which the user conducts an assessment, the tool captures application-specific data. For example, and without limitation, the tool can capture one or more of the following types of application specific data:
   questions to ask about the particular application;
   vulnerabilities associated with the particular application;
   material added to the "query an expert" function that would
      permit that function to be more appropriately used for
      the particular application; and
   report templates for the particular application.

Information collected from the user is then stored and used to generate application specific information to implement the enterprise's methodology in a computer system. The generated application specific information may include, without limitation, a software interface to the application-specific databases and other data repositories.

Systems and methods for collecting problem solving information are commercially available. Based on the description herein, one skilled in the relevant art(s) will understand how to implement this aspect of the invention.

III. Example Systems for Assessing Information Security

The present invention can be implemented manually, and/or in software, hardware, firmware, manually, and/or combinations thereof. Systems for implementing the present invention are now described with the assistance of functional block diagrams. Based on the descriptions and functional block diagrams herein, one skilled in the relevant art(s) will be able to implement the invention manually, and/or in software, hardware, firmware, and/or combinations thereof.

In an embodiment, the invention is implemented in software as an interactive set of tools referred to generally herein as a security tool kit ("STK"), which operates from a CD-ROM or downloadable software on a user's desk top or lap top computer. The STK poses questions to a user about technical characteristics of a local computing environment and the procedures used to create, store, and transmit computerized information within the user's computers and between the user's computes and other computers. From the responses of the user, the STK identifies deficiencies in the capability of the local computing environment to protect information from unauthorized disclosure, and it will suggest corrective actions that can be applied to correct these deficiencies. The STK evaluates existing information security policies and procedures, and it will guide the user through the process of developing information security policies for the local computing environment.

The invention can be implemented for government enterprises, commercial enterprises, and for both government enterprises and commercial enterprises.

A. Example Security Tool Kit

Figure 6:
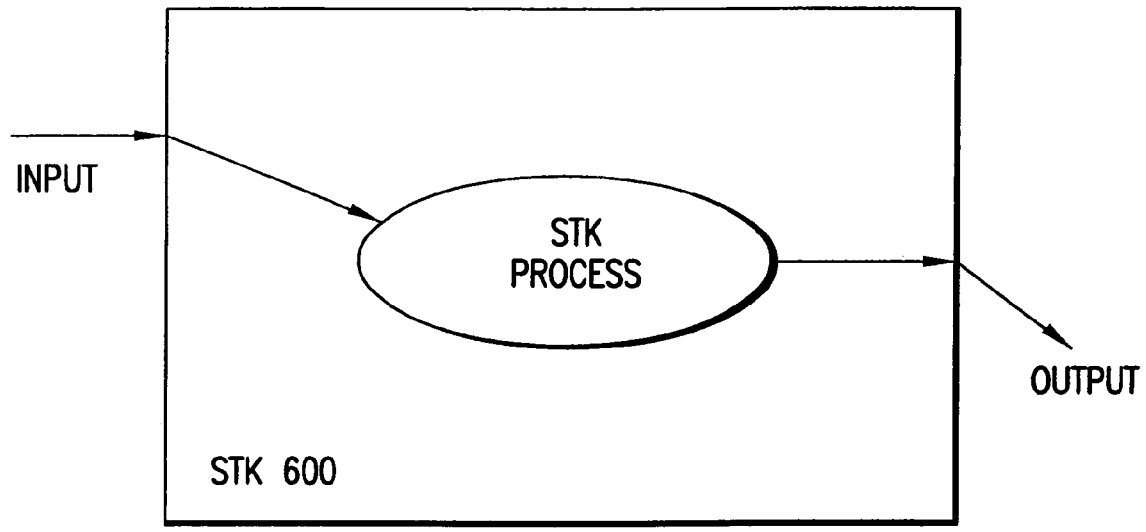
FIG. 6 illustrates a high level block diagram of a system for assessing information security, in accordance with the present invention.

FIG. 6 illustrates a high level block diagram of an example security tool kit ("STK") 600.

Figure 13:
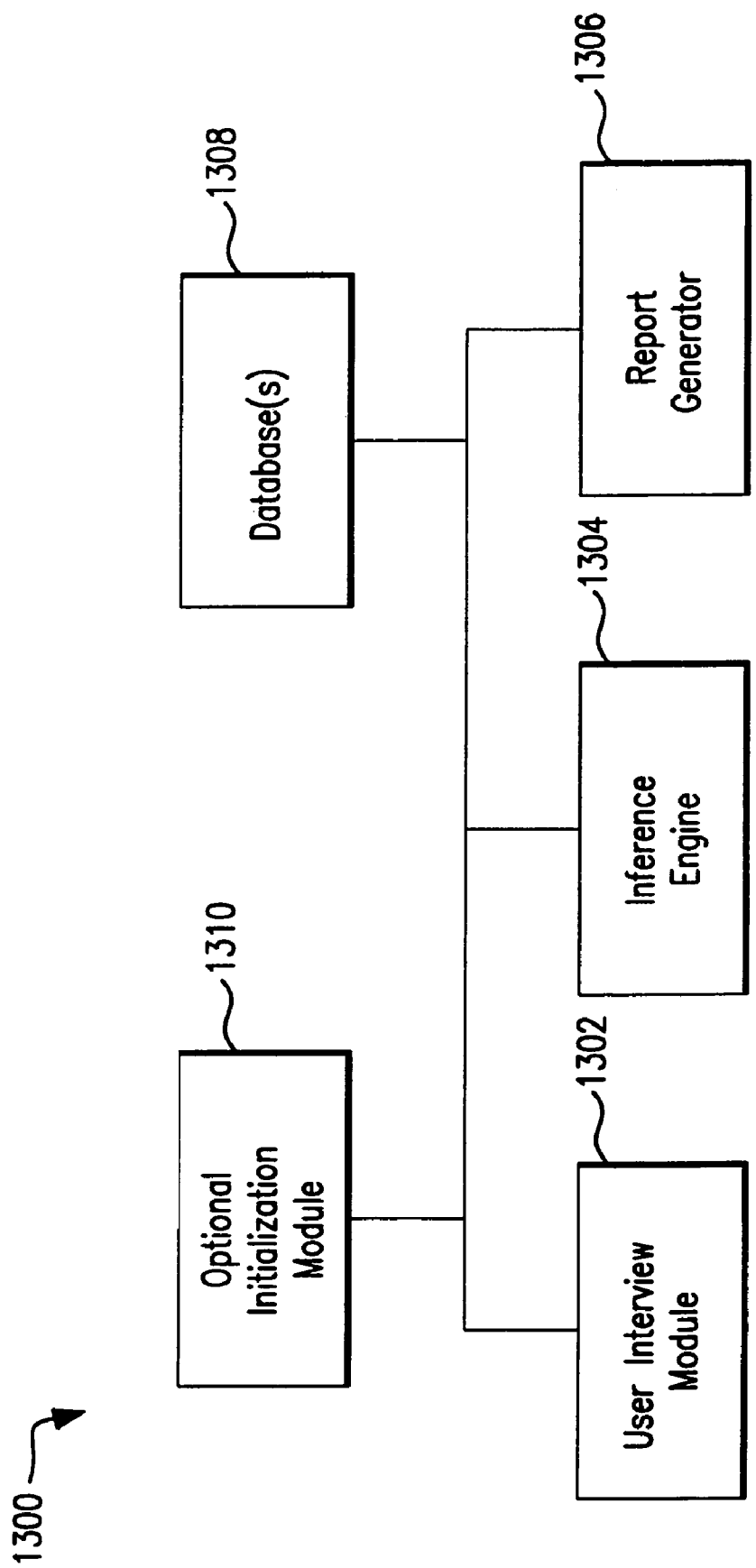
FIG. 13 illustrates a block diagram of an example system for assessing information security, including an optional initialization module, in accordance with the present invention.

FIG. 13 illustrates an example of STK 600 as STK 1300, including a user interview module 1302, an inference engine 1304, a report generator 1306, databases 1308, and an optional initialization module 1310.

Figure 14:
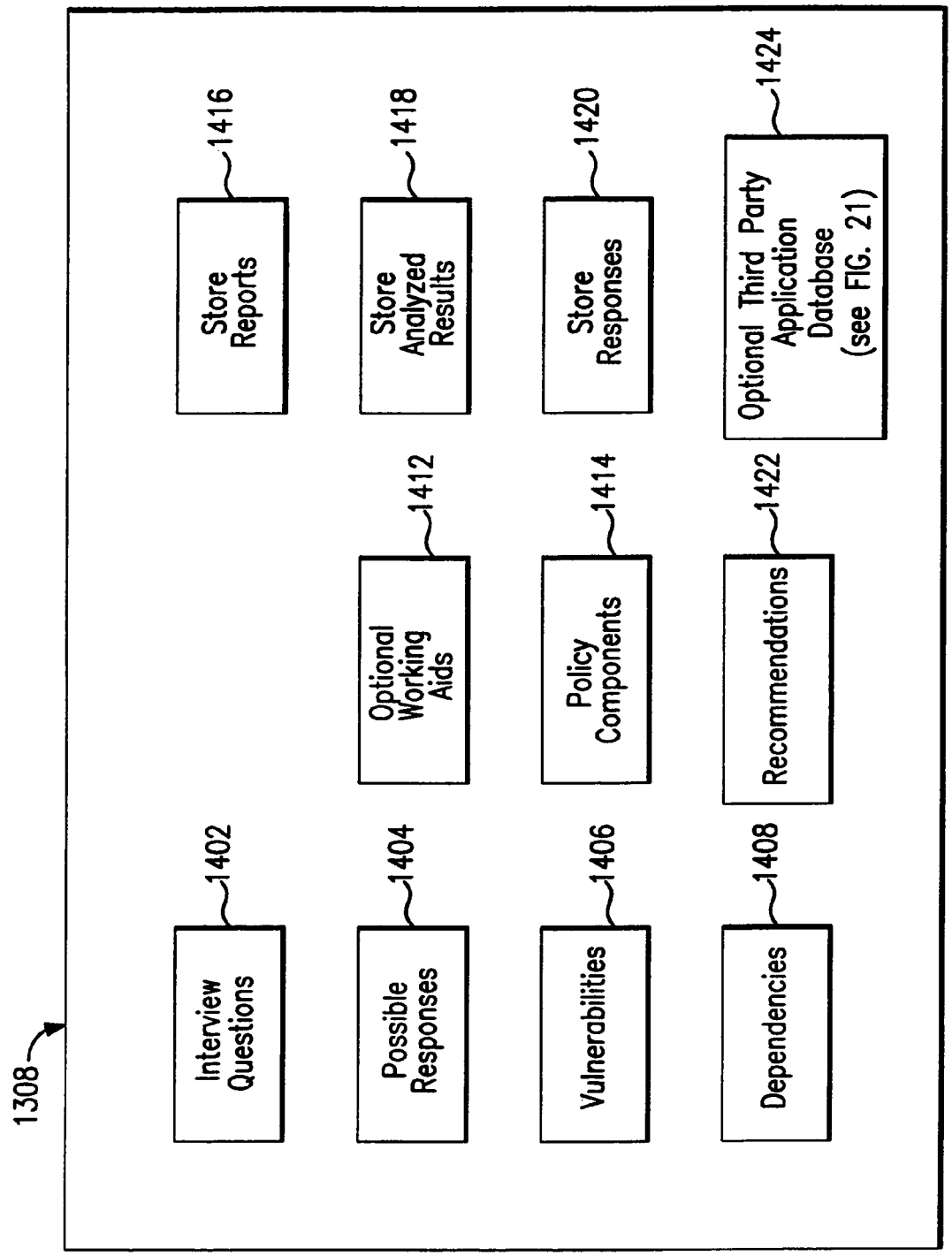
FIG. 14 illustrates a block diagram of an example database, in accordance with the present invention.

FIG. 14 illustrate an example implementation of databases 1308, including interview questions 1402 and possible responses 1404. interview questions 1402 can include generic questions, generic questions modified for product specific modules, and/or product specific questions.

Databases 1308 also include vulnerabilities 1406, dependencies 1408, and risks 1410. Vulnerabilities 1406 is a repository of information security vulnerabilities. Dependencies 1408 is a repository of relationships among questions and answers. In other words, dependencies 1408 can include a function that map answers to results. Risks 1410 is a repository of information security risks, which can include generic risks and/or industry specific risks.

Databases 1308 also include optional working aids 1412, policy components 1414, and recommendation 1422. Policy components 1414 preferably include information security policies with numbered sections. Recommendations 1422 preferably include policy sections specific to identified deficiencies.

Databases 1308 also includes store responses 1416, store analyzed results 1418, and store reports 1420. Store responses 1416 include user answers. Store analyzed results 1418 can include the results of the inference engine 1304 and/or possible answers to questions associated with the questions. Store reports 1420 are generated by the report generator 1306.

Figure 15A:
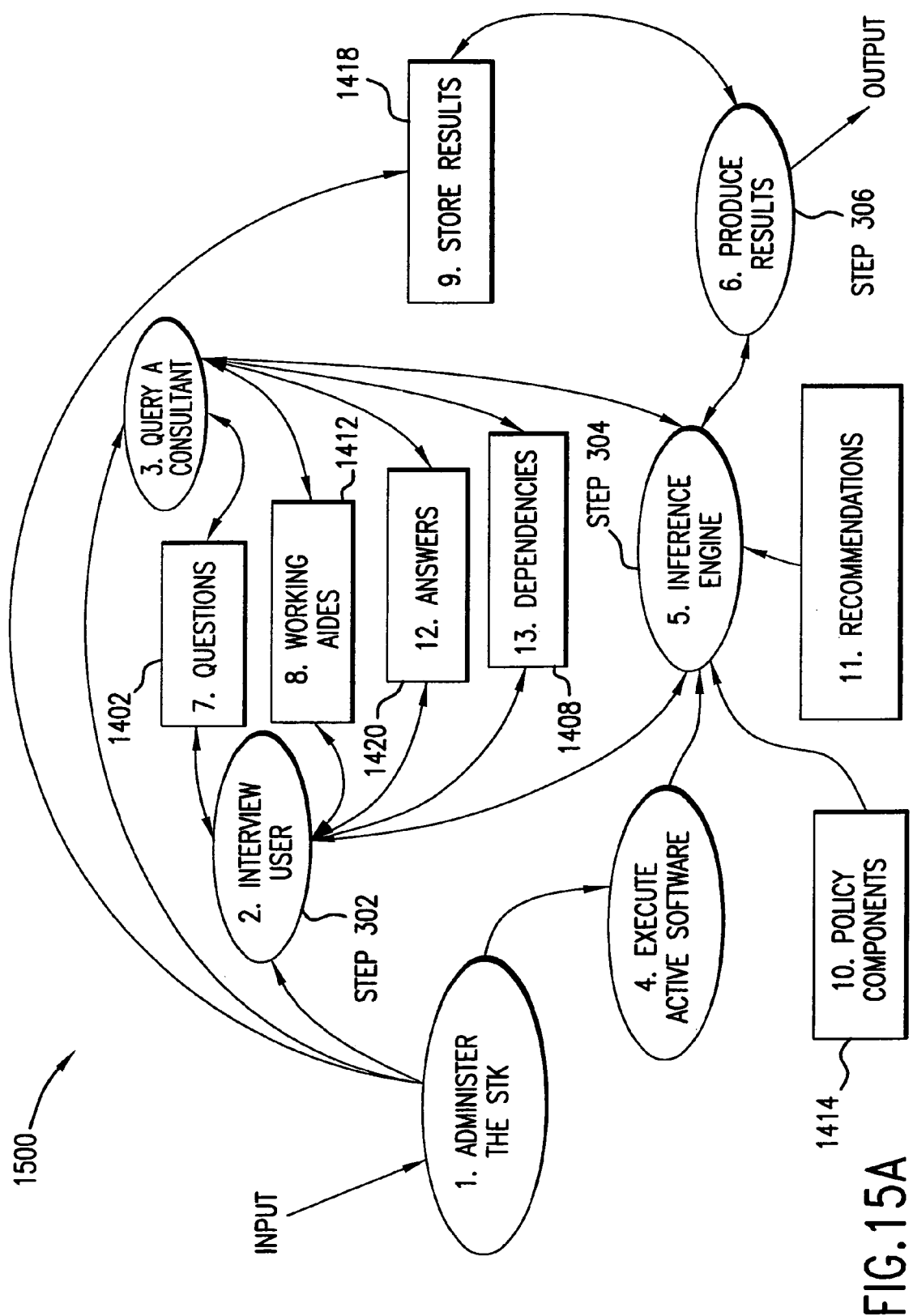
FIG. 15A illustrates an example data flow process for assessing information security, in accordance with the present invention.
Figure 15B:
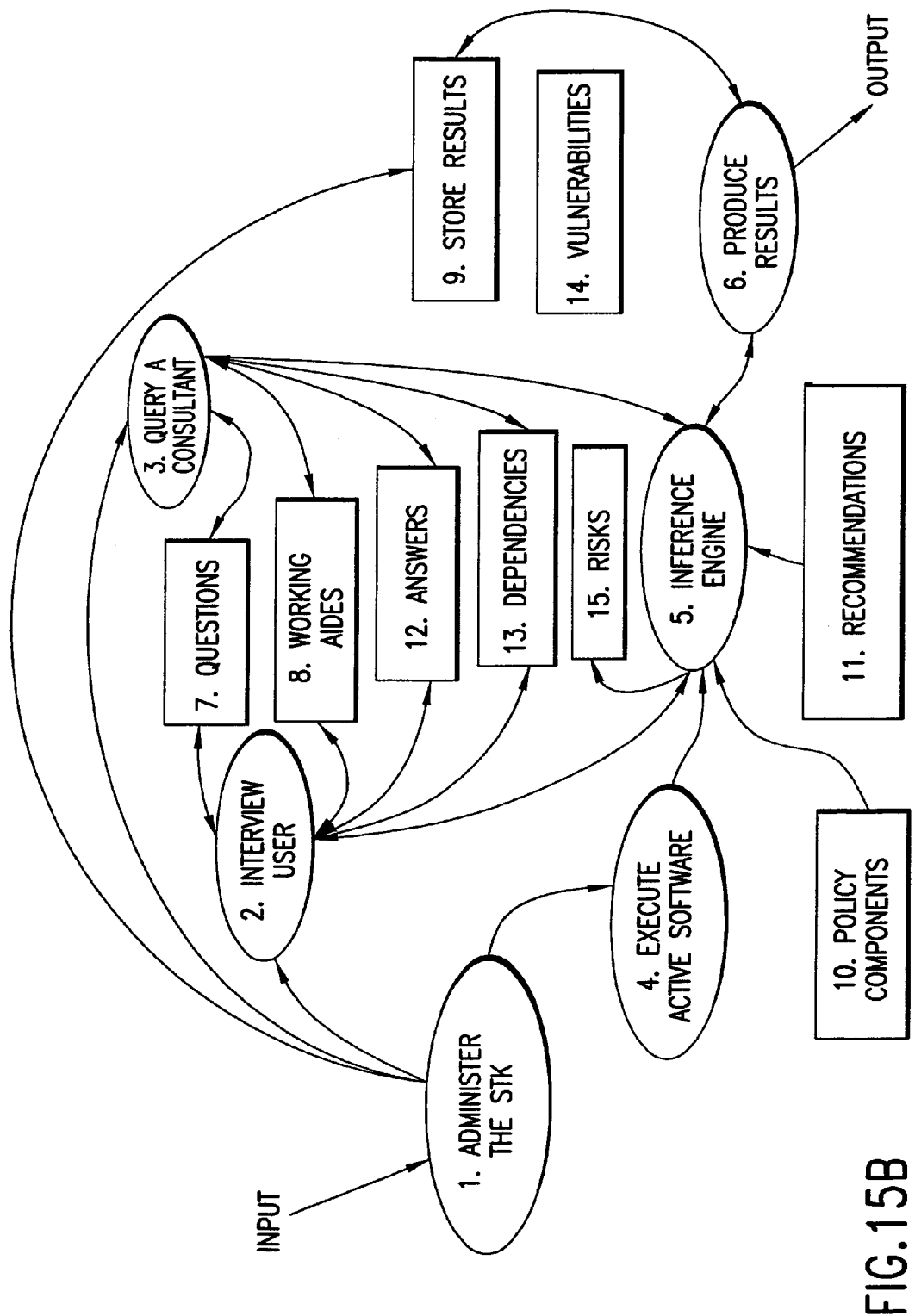
FIG. 15B illustrates an example data flow process for assessing information security, in accordance with the present invention.

FIGS. 15A and 15B illustrate example data flows for the example STK 1300 and for some of the databases. Numbers, other than element reference numbers typically used throughout this specification, are for reference purposes only and do not indicate a sequence for performing any processes.

In an embodiment, store responses 1416, store analyzed results 1418, and store reports 1420, include results from one or more prior information security assessments. In such an embodiment, analysis module 1304 includes a second inference engine for comparing assessments, and report generator 1306 includes a report generator for generating reports for assessment comparisons.

1. Optional Initialization Module

The optional initialization module 1310 can be implemented to perform a variety of functions and/or processes. For example, in an embodiment, the optional initialization module 1310 performs a Super User Function, which includes the following sub-functions:

specify if this is a new assessment;
authenticate "super user" with privilege to assign user names and privileges;
determine which users have privileges to enter data in specified STK modules (described below) for the current assessment; and
assign user names and access privileges to individuals.

In an embodiment, the optional initialization module 1310 performs a enterprise type identification process, which includes obtaining a company name and industry type.

In an embodiment, the optional initialization module 1310 allows users to start a new assessment, resume a previously begun assessment, or compare a previously completed assessment.

In the example embodiment described, the optional initialization module 1310 receives interactive user input and outputs an industry type and company identification information.

2. Interview Module

The interview module 1302 presents questions to users. In an embodiment, the interview module 1302 receives an industry type, selects industry specific questions, and presents the industry appropriate questions to users.

The interview module 1302 compares user answers to the database of possible responses 1404 and prompts the user to re-answer if an answer is not permissible. In an embodiment, the interview module 1302 checks answers for dependencies to other questions.

3. Inference Engine

The inference engine 1304 identifies information security deficiencies based at least on user responses (store responses 1420 in FIG. 14) and vulnerabilities 1406 (FIG. 14). In an embodiment, the inference engine 1304 also considers one or more of the following:

third party vulnerabilities 2108;
third party testing/diagnostic application test results; and
user queries to a knowledge database (e.g, query an expert module 1902 in FIG. 19), and/or responses to such user queries.

In an embodiment, the inference engine 1304 first identifies vulnerabilities based on user responses to certain questions. The inference engine 1304 then analyzes the vulnerabilities, in light of any of a variety of relevant factors, which can include, without limitation, one or more of the user responses that were used to identify the vulnerabilities. Based on the analysis of any identified vulnerabilities, the inference engine 1304 identifies security deficiencies.

Information security deficiencies can include IT infrastructure deficiencies and policy deficiencies. Policy deficiencies can be in the form of information security policy sections or statements.

In an embodiment, inference engine 1304 determines risks. Risks can be based on one or more of, interview questions, associated user responses, industry type, vulnerabilities, and/or asset value. In an embodiment, the inference engine 1304 receives a list of questions, associated user answers, and an industry type, and outputs a rank ordered list of critical information security risks, policy sections associated with specified vulnerabilities, and policy sections associated with specified risks.

The inference engine 1304 can be implemented to perform one or more of the following tasks:

interprets results of active and/or passive third party testing/diagnostic software;
correlate answers with vulnerabilities;
identify deficiencies;
rank deficiencies in order of criticality; and
determine applicable sections of information security policy.

In an embodiment, inference engine 1304 is a logic based inference engine. In an example implementation, the logic is embodied in software, such as software compiled from C++, for example. Alternatively, the logic is a specification language, or interpreted language.

In an embodiment, inference engine 1304 is an expert system (or knowledge based system) in which knowledge from human subject-matter experts is encoded into a software program in such a way that the coded logic of the software program provides a searchable repository of this subject-matter knowledge. The expert system is encoded in such a way as to accept input and make inferences based on the implications of that input that a human subject-matter expert would normally be expected to make but which were not specifically encoded in the expert system.

In an embodiment, inference engine 1304 is an artificial intelligence (AI) system, such that input data is subjected to analysis by the AI-based inference engine and the problem solving methods or analysis or other tasks for which the AI system is designed is modified by the AI system itself as a result of the output of previous processing cycles.

In an embodiment, the inference engine 1304 permits users to review results of previously completed assessments, perform "what if" scenarios by varying the previously entered answers and inputs, and observe the resulting outputs. This can be useful, for example, in deciding how to change a computing environment.

In an embodiment, the inference engine 1304 permits users to compare results of a previous assessment with results of a current assessment.

Accordingly, the inference engine 1304 can be implemented to perform, or allow a user to select, one or more of the following functions:

choose a previously completed assessment to analyze;
choose a segment (e.g., portion or domain) of a selected a assessment to analyze (user may choose to select one or more such segments for comparison and analysis);
compare a selected assessment/segment(s) with a current assessment to identify differences;
permit user to vary or change answers to questions of a selected previously completed assessment/segment and observe the differences in the outputs and reports;
display results of comparison/analysis to user on a display; and save results of comparison/analysis to pass to report generator.

4. Report Generator

The report generator 1306 can be implemented to perform one or more of the following features:
- determine applicable report type;
- format report for viewing;
- format report for printing;
- format report for saving in STK database 1308.

Typically, the report generator 1306 receives questions posed to users and associated user answers, a list of working aids accessed during an interview, and analyzed results of user interviews.

Example processes that are typically performed by the report generator 1306 are now described. Unless otherwise specified, these processes are optional and combinable.

In a determine a report type function, the report generator 1306 correlates questions and answers with one or more appropriate types of reports, and selects a report template from a database of templates. Report types can include, without limitation, the following:
- risk assessment of local computing environment;
- deficiencies in local environment that require immediate attention;
- deficiencies in local environment that require further analysis;
- deficiencies that must be escalated for enterprise-wide analysis and resolution;
- information security policy for local computing environment;
- measure of enterprise conformance to the information security policy;
- measure of overall security posture of the enterprise;
- measure of the effectiveness of enterprise-wide security training and awareness programs; and
- list of most serious information security problems facing the enterprise.

The report generator 1306 inserts appropriate information into reports, such as enterprise identification information. The report generator 1306 also formats and inserts questions posed to users and user responses into the report.

Where optional working aids are utilized, the report generator 1306 inserts any working aid material that was accessed during an interview into the report. More specifically, the report generator 1306 selects appropriate templates for a working aids section of the report, and inserts selected working aids material into the report.

Where implemented, the report generator 1306 inserts results of any queries to the query and expert module 1902 (FIG. 19), into the report.

Where implemented, the report generator 1306 inserts results of any executions of third party software into the appropriate report.

Where appropriate, the report generator 1306 inserts any analyses of prior assessments into the report. More specifically, the report generator 1306 selects a template for an appropriate report format and inserts prior assessment results into the report.

The report generator 1306 prints reports upon appropriate request and saves reports in a report database for future reference.

5. Graphical User Interface

In an embodiment, the STK 1300 includes a graphical user interface (GUI) with a pull-down menu structure. In an example implementation, the pull-down menu includes the following tool bars. The example below includes options for multiple domains, referred to in this example as segments.

The example below is for illustrative purposes only. Other tool bars, tool bar features, and GUIs are within the scope of the present invention.

| Main Menu Bar | | |
|---|---|---|
| A. | File | |
| | 1. | New (slide across) |
| | |     Assessment |
| | |     Segment |
| | 2. | Open (pop-up window (tree) listing Assessments and Segments) |
| | 3. | Close |
| | 4. | Save |
| | 5. | Delete |
| | |     Assessment |
| | |     Segment |
| | 6. | Print |
| | |     Question Templates |
| | |     Report Templates |
| | 7. | Exit |
| B. | Administer | |
| | 1. | Add New User |
| | |     User Name |
| | |     Organization |
| | |     Job Function (radio button) |
| | |         System Administrator |
| | |         Security Administrator |
| | |         Security Officer |
| | |         Manager |
| | |         CIO |
| | |     Phone Number |
| | |     Email Address |
| | |     Privileges |
| | |         <assessment name> (pull-down) |
| | |             <segment name (radio buttons)> |
| | |                 view (default) |
| | |                 enter data |
| | |                 delete segment |
| | |     Username: |
| | |     Password: |
| | |     Confirm Password: |
| | 2. | Modify User |
| | 3. | Delete User |
| | |     Username to delete: |
| | |     Confirm Username to delete: |
| | 4. | List Users (radio buttons) |
| | |     <by assessment |
| | |         <assessment name> (pull down) |
| | |     <by segment> |
| | |         <segment name> (pull down) |
| | |     <all users> |
| | 5. | Create New |
| | 6. | Assign user privileges |
| C. | Compute Risk | |
| D. | Help | |
| | 1. | Contents and Index |

B. Multiple Domains and Roll-Up Features

In an embodiment, the present invention includes a roll-up module for assessing information security for an enterprise based on multiple domains.

Figure 16:
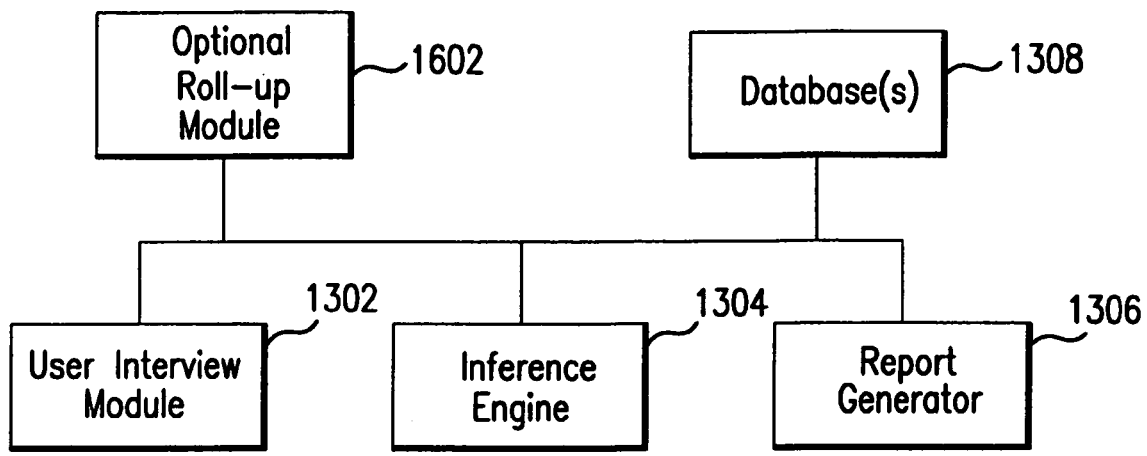
FIG. 16 illustrates a block diagram of an example system for assessing information security, including an optional roll-up module, in accordance with the present invention.
Figure 18:
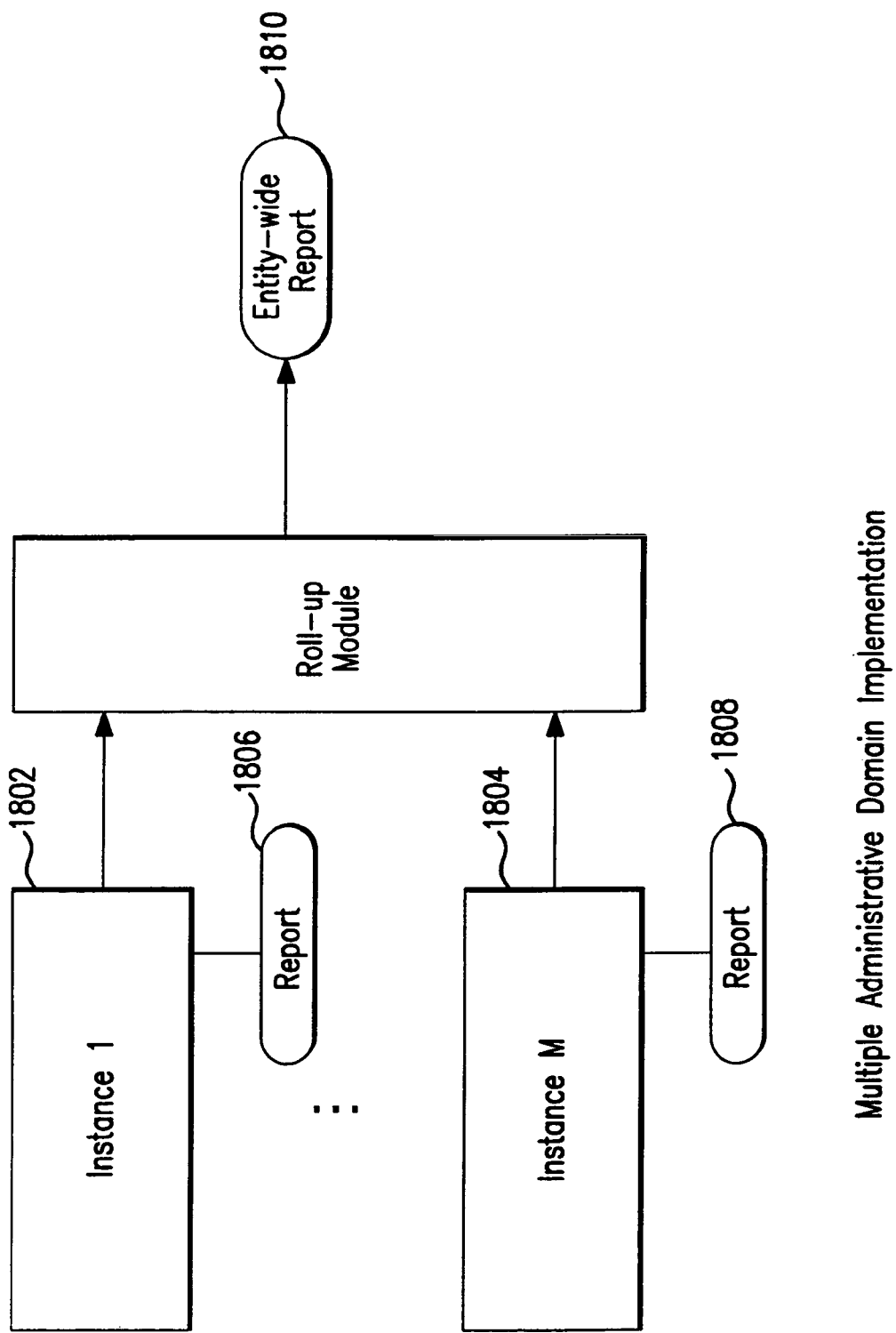
FIG. 18 illustrates a block diagram of example details of the optional roll-up module, in accordance with the present invention.

FIG. 16 illustrates the STK 1300 with an optional roll-up module 1602. FIG. 18 illustrates an example multiple domain implementation. In this example, separate instances 1802 through 1804 of the STK 1300 are provided for each domain within an enterprise. Each STK instance 1802 through 1804 preferably provides a local domain report, 1806 and 1808. Each STK instance 1802 through 1804 also provides information to the roll-up module 1602, which analyzes the combined results and generates an enterprise-wide report 1810.

Figure 17:
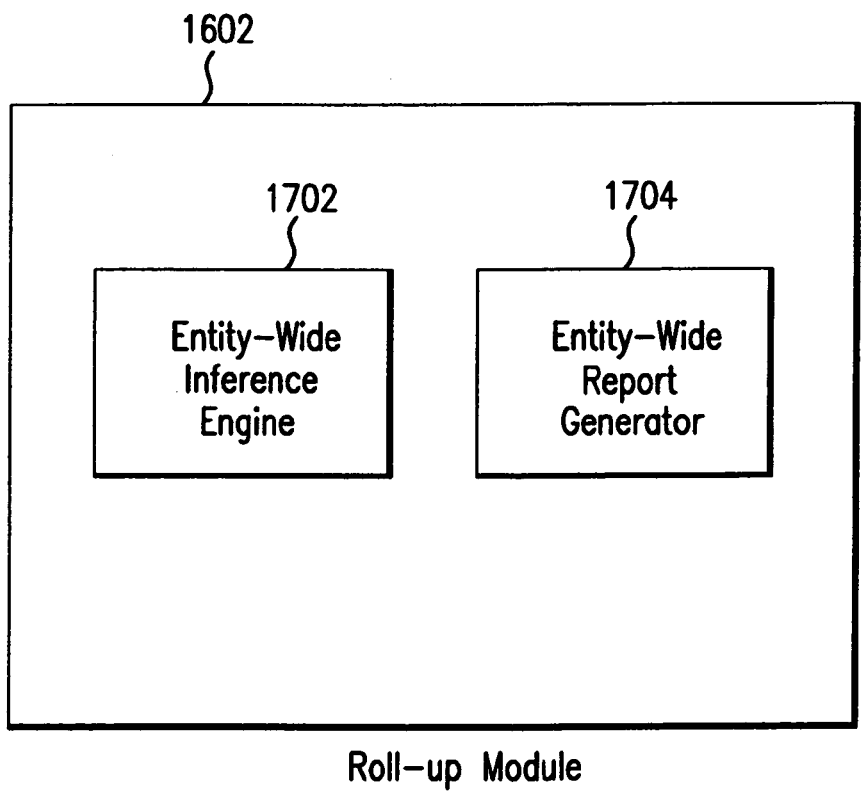
FIG. 17 illustrates a block diagram of example details of the optional roll-up module, in accordance with the present invention.

In FIG. 17, the optional roll-up module 1602 is illustrated with an enterprise-wide inference engine 1702 and an enterprise-wide report generator 1704. The enterprise-wide inference engine 1702 analyzes information from the multiple domains. In an alternative embodiment, this function is performed by inference engine 1304 in FIG. 13.

In an embodiment, the enterprise-wide inference engine 1702 combines user responses from multiple domains, looks for relationships among the responses, identifies deficiencies across the enterprise, and presents an aggregate description of the security posture of the enterprise.

In an alternative embodiment, the enterprise-wide inference engine 1702 combines analysis results from the multiple domains, identifies deficiencies across the enterprise, and presents an aggregate description of the security posture of the enterprise.

In an alternative embodiment, the enterprise-wide inference engine 1702 combines individual reports from multiple domains and presents an aggregate description of the security posture of the enterprise.

C. Query an Expert Module

Figure 19:
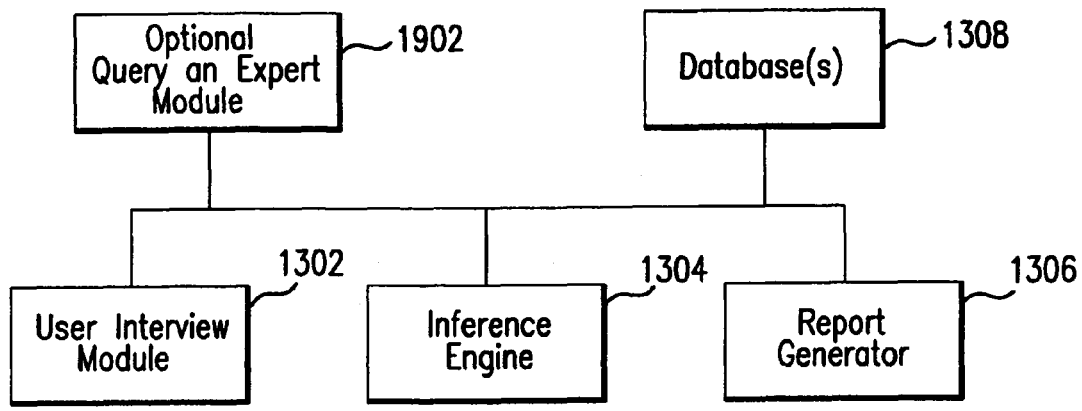
FIG. 19 illustrates a block diagram of an example system for assessing information security, including an optional expert query module, in accordance with the present invention.

FIG. 19 illustrates an optional query an expert module 1902, which allows users to "query an expert." In an embodiment, query an expert module 1902 provides insights and assistance in performing systems and security administration functions through look-up tables. In more complex implementations, query an expert module 1902 includes a knowledge base of information security expertise and a more sophisticated query capability. Preferably, the knowledge base is updated periodically to reflect newly identified vulnerabilities and information security practices.

Two example implementations of the optional query an expert module 1902 are presented below. These example implementations are provided for illustrative purposes only. Based on the teachings herein, one skilled in the relevant art(s) will understand that other implementations are also possible, which are within the scope of the present invention.

In a structured query implementation, the optional query an expert module 1902 permits users to ask structured queries. Upon receipt of a query, the query an expert module 1902 determines a relevant area of information security knowledge and presents a list of related information security knowledge to the user. The user can then select a specific item within the displayed area of information security knowledge.

In a natural language implementation, the optional query an expert module 1902 permits users to ask unstructured questions. Upon receipt of a query, the query an expert module 1902 determines a relevant area of information security knowledge and presents a list of related information security knowledge to the user. The user can then select a specific item within the displayed area of information security knowledge.

In an embodiment, the query an expert module 1902 correlates users' answers with related sections of the optional working aids database 1412. The query an expert module 1902 then presents retrieved working aids material to the user. This is useful, for example, to indicate to the user why a topic of the interview is important.

D. Third Party Testing/Diagnostic Modules

Figure 20:
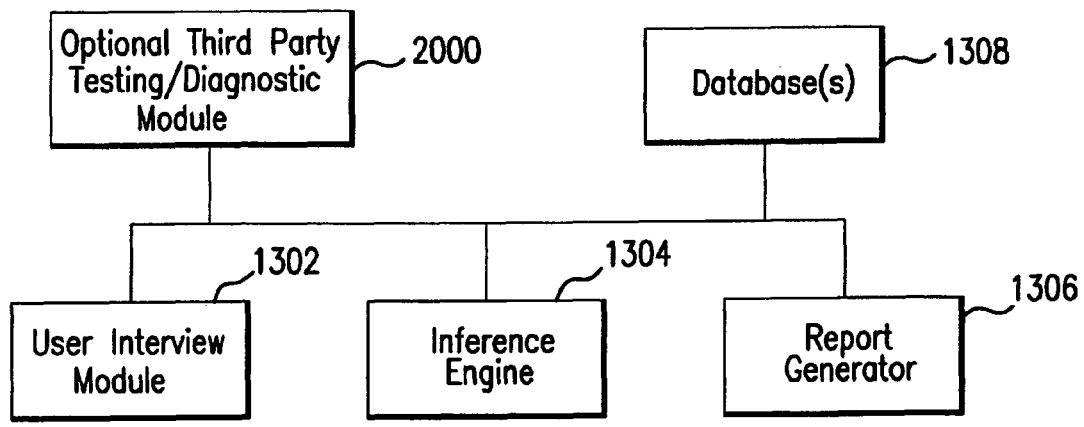
FIG. 20 illustrates a block diagram of an example system for assessing information security, including an optional third party testing/diagnostic module, in accordance with the present invention.

FIG. 20 illustrates an optional third party testing/diagnostic plug-in module ("module") 2000, which interfaces the STK with commercial third party testing/diagnostic programs. Third party testing/diagnostic programs include tools that conduct active network scans and/or passive network monitoring.

Module 2000 includes any necessary interfacing features to allow the STK 1300 to execute one or more selected third party testing/diagnostic programs. Optionally, the module 2000 also includes necessary interfacing features to allow the STK 1300 to receive results from the selected third party testing/diagnostic programs, so that the STK 1300 can analyze the results in combination with user responses.

When implemented, module 2000 presents a list of available third party software applications to the user and receives a user selection. The module 2000 then executes the selected application, presents the results to the user, and makes the results available to the inference engine 1304 and/or the report generator 1306.

In an embodiment, based on answers obtained during the interview process, module 2000 determines which portion(s) of the third party application results to analyze. The module 2000 also determines the level of detail of the results of the third party application to analyze. The module 2000 extracts relevant information from the results of the third party application and presents the results of the analysis to the user. The module 2000 also preferably saves the results in the database 1308.

E. Third Party Application Modules

Figure 21:
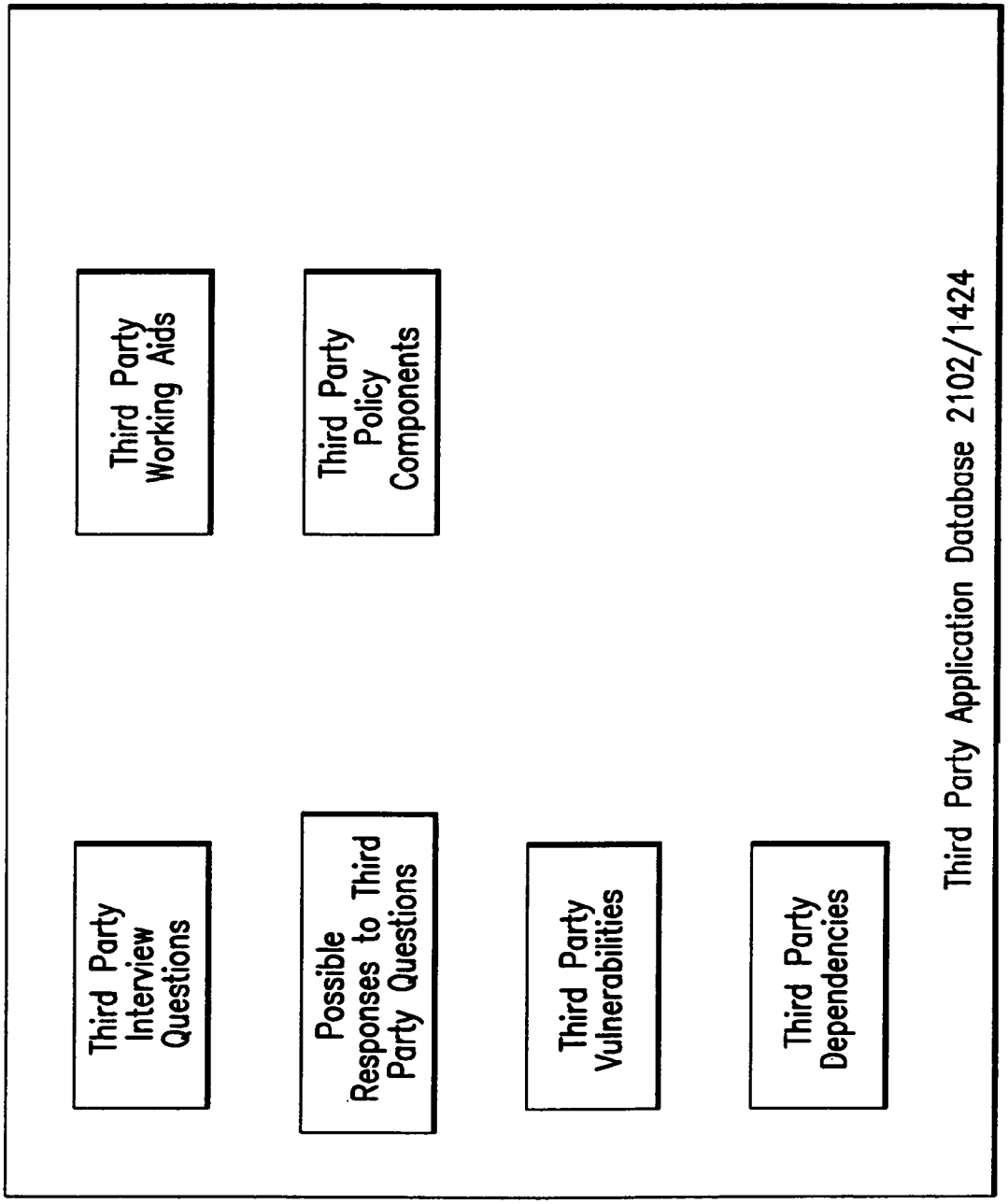
FIG. 21 illustrates a block diagram of an example third party application database, including an optional roll-up module, in accordance with the present invention.

FIG. 21 illustrates database 1308 with an optional third party application database 2102, which provides application specific features that allow the STK 1300 to assess information security for one or more particular applications operating on the IT infrastructure of an enterprise.

In the example illustrated in FIG. 21, the optional third party application database 2102 includes a third party specific questions 2104, third party possible responses 2106, third party specific vulnerabilities 2108, optional third party specific working aids 2110, third party specific policy components 2112, and optional third party specific risks 2114.

User interview module 1302, inference engine 1304, and report generator 1306, operate as previously described, with additional interviewing, assessing, and reporting functions provided by the optional third party application database 2102.

F. Implementation in a Computer Program

In an embodiment, the invention is implemented in one or more computer systems capable of carrying out the functionality described herein.

Figure 22:
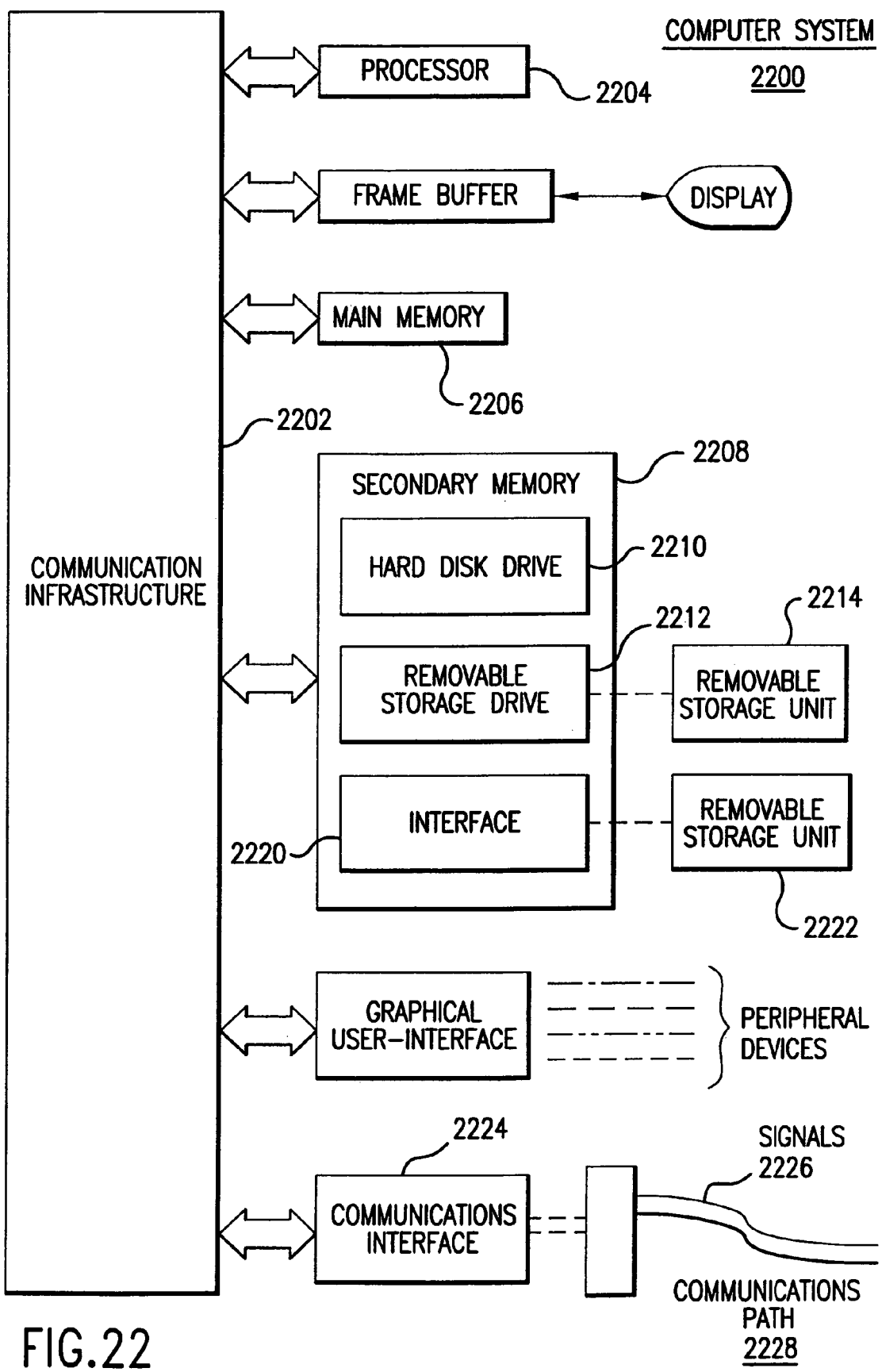
FIG. 22 illustrates a block diagram of an example computer system architecture on which the present invention can be implemented.

FIG. 22 illustrates an example computer system 2200, including one or more processors 2204. Processor 2204 is connected to a communication bus 2202. Various software embodiments are described in terms of this example computer system 2200. After reading this description, it will become apparent to a person skilled in the relevant art how to implement the invention using other computer systems and/or computer architectures.

Computer system 2200 also includes a main memory 2206, preferably random access memory (RAM), and can also include a secondary memory 2208. Secondary memory 2208 can include, for example, a hard disk drive 2210 and/or a removable storage drive 2212, representing a floppy disk drive, a magnetic tape drive, an optical disk drive, etc. Removable storage drive 2212 reads from and/or writes to a removable storage unit 2214 in a well known manner. Removable storage unit 2214, represents a floppy disk, magnetic tape, optical disk, etc. which is read by and written to by removable storage drive 2212. Removable storage unit 2214 includes a computer usable storage medium having stored therein computer software and/or data.

In alternative embodiments, secondary memory 2208 can include other similar means for allowing computer programs or other instructions to be loaded into computer system 2200. Such means can include, for example, a removable storage unit 2222 and an interface 2220. Examples of such can include a program cartridge and cartridge interface (such as that found in video game devices), a removable memory chip (such as an EPROM, or PROM) and associated socket, and other removable storage units 2222 and interfaces 2220 which allow software and data to be transferred from the removable storage unit 2222 to computer system 2200.

Computer system 2200 can also include a communications interface 2224. Communications interface 2224 allows software and data to be transferred between computer system 2200 and external devices. Examples of communications interface 2224 include, but are not limited to a modem, a network interface (such as an Ethernet card), a communications port, a PCMCIA slot and card, etc. Software and data transferred via communications interface 2224 are in the form of signals 2226, which can be electronic, electromagnetic, optical or other signals capable of being received by communications interface 2224. These signals 2226 are provided to communications interface 2224 via a signal path 2228. Signal path 2228 carries signals 2226 and can be implemented using wire or cable, fiber optics, a phone line, a cellular phone link, an RF link and other communications channels.

In this document, the terms "computer program medium" and "computer usable medium" are used to generally refer to media such as removable storage device 2212, a hard disk installed in hard disk drive 2210, and signals 2226. These computer program products are means for providing software to computer system 2200.

Computer programs (also called computer control logic) are stored in main memory and/or secondary memory 2208. Computer programs can also be received via communications interface 2224. Such computer programs, when executed, enable the computer system 2200 to perform the features of the present invention as discussed herein. In particular, the computer programs, when executed, enable the processor 2204 to perform the features of the present invention. Accordingly, such computer programs represent controllers of the computer system 2200.

In an embodiment where the invention is implemented using software, the software can be stored in a computer program product and loaded into computer system 2200 using removable storage drive 2212, hard drive 2210 or communications interface 2224. The control logic (software), when executed by the processor 2204, causes the processor 2204 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

IV. Example Implementation

In an embodiment, the invention is implemented to perform the following initialization features:
 establish an assessment category (government v. commercial, and any compliance criteria (e.g., DITSCAP, NSA IAM)).
 determine category of user (e.g., application administrator, network administrator, senior IT professional (e.g., CIO));
 determine mode of use (standalone v. roll-up); and
 determine mode of implementation (generic v. product specific).

In an embodiment, the invention is implemented to interview users generically and/or application specifically (e.g., SAP, Oracle).

In an embodiment, the invention is implemented to interview users based on their associated areas of expertise.

In an embodiment, the invention is implemented to assess domains and the corresponding enterprise as a whole.

In an embodiment, the invention is implemented to allow users to query an expert (generically and/or application specifically).

In an embodiment, the invention is implemented to allow users to execute third party applications, such as third party active and/or passive diagnostic/test applications.

In an embodiment, the invention is implemented with all of the above features. In alternative embodiments, the invention is implemented with fewer than all of the above features.

V. Example Questions

A. Example 1

Assessment Set-Up
1. What is the company's name? (input box)
2. What is the company's address? (input box)

Specific information about the target for the assessment must be gathered at this point. The target for the assessment is part, or parts, of the company that will undergo the assessment. For example, the target may be a company's e-commerce business, a specific file server, all networks utilized by the finance organization, or the entire company.

3. What name will be used for the target of the assessment? (input box)
4. How does the target of the assessment derive its income? (pull down menu)

| Answer Options | Help Text |
| --- | --- |
| Banking | |
| Consulting | |
| Education | |
| Government | |
| Insurance | |
| Medical | |
| Retail | |
| Technology | |
| Transportation | |
| Utilities | |

Within the target, there are one or more domain boundaries which defines who owns, manages, or controls what the regard to its Information Technology (IT) resources. Domain boundaries may have been created around LAN segments, IP addresses, physical locations, or job functions. For small targets, there may be only one domain boundary, meaning all IT resources within that boundary are controlled by the same administrators, while larger targets may have several domain boundaries.

It is important for the Toolkit to know about, and differentiate among, domain boundaries, because each will likely have different characteristics. An accurate risk assessment will depend on describing the target of the assessment accurately.

5. How many divisions, defined by domain boundaries, exist within the target? (radio button)
one
more than one
 If the answer to question 5 is "one," then ask question 6:
6. What is the name of the domain boundary area?
Division Name (Input Box)
 If the answer to question 5 is "more than one," then ask question 7:
7. Name each domain boundary.
Division Name (Input Box) Add Another Done (Radio Buttons)

Scope and Boundary
Identify and Value Assets
Network Characteristics Section
200. Database
300. Email
400. Web
Assets Enter information about the web servers within this domain boundary. (Input box for web server name, pull down menus for OS platform, OS version and Function. See question 801 for an explanation of how the pull down menus for OS platform and OS version should work.)
Server Name
Server Type
Hardware Architecture
OS platform
OS version
Function

| Answer Options - Server Type | Answer Options - Version | Help Text |
|---|---|---|
| Apache | x.x | |
| Netscape | x.x | |

| Answer Options - OS platform | Answer Options - HW arch | Answer Options - OS Version | Help Text |
|---|---|---|---|
| Solaris | Intel, Spare | 2.4, 2.5.1, 2.6, 2.7, 2.8 | |
| RedHat Linux | Intel, Spare | 5.2, 6.0, 6.1 | |
| Windows | Intel | 3.1, 95, 98, NT | |
| HP-UX | PA-RISC | 9.x, 10.10, 10.20, 11.0 | |

| Answer Options - Function | Help Text |
|---|---|
| E-Commerce on Internet | |
| Host Internet web site | |
| Intraoffice applications | |
| Interoffice applications | |

Is the hardware on which this web server runs owned/controlled/managed by the web administrator? (radio button)
Yes
No
   If yes, then ask 2 questions about asset value:
   What is the replacement cost of the asset?
Low
Medium
High
   What is the impact on the company if the asset is disclosed, modified, destroyed or misused?
Low
Medium
High
   Which of the following data items are assets of this web server? (radio buttons)
Code which drives Web pages (html, Java, per, etc)
Multi-media contained on Web pages (graphics, audio, video, etc)
Customer information collected via Web pages
Customer orders collected via Web pages
   IT configuration Does the web server run as root? (radio button)
Yes
No
Policies and Procedures
<john>
Threats
   Did this web server experience a security breach within the six months? (radio buttons—Yes, No, Don't Know)
   Did this web server experience a security breach within the last year? (radio buttons—Yes, No, Don't Know)
Vulnerabilities
   Has a security configuration guide been consulted for the installation and testing of this web server? (radio buttons—Yes, No, Don't Know)
   Are published vulnerabilities associated with this type of web server tracked and countermeasures implemented? (radio buttons—Yes, No, Don't Know)
Safeguards
500. File Server (NFS)
600. Network Information (DNS, NIS., NIS+)
700. Critical Infrastructure Components (routers, firewalls, modem banks., etc)
800. Desktops (Installation, OS Patches, User Access, Trust)
801. Enter all the operating systems which are used as clients on the network. (pull down menus, as follows. If user chooses Solaris for "OS client', the version numbers in the pull down menu under "Version" automatically change to reflect the possible Solaris versions. User should have options at the bottom for "OK" to enter the next operating system, "Done" to indicate all operating systems have been entered, "Back" to look at the previous operating system entered, and Next" to move forward. There should be a summary presented of all the information chosen for this question after the user hits "Done". Require user to enter "Done" on the summary screen to move ahead to next question.)
OS Client Version Internet Connect Num Clients % Patched Lag time

| Answer Options - OS client | Answer Options - Version | Help Text |
|---|---|---|
| Solaris | 2.4, 2.5.1, 2.6, 2.7, 2.8 | |
| RedHat Linux | 5.2, 6.0, 6.1 | |
| Windows | 3.1, 95, 98, NT | |
| HP-UX | 9.x, 10.10, 10.20, 11.0 | |

| Answer Options - Internet Connectivity | Help Text |
|---|---|
| Yes | |
| No | |
| Don't Know | |
| HP-UX | |

| Answer Options - Num Clients | Help Text |
|---|---|
| 1–5 clients | |
| 6–10 clients | |
| 11–20 clients | |
| 21–50 clients | |
| 51–100 clients | |
| More than 100 clients | |

| Answer Options - % patched | Help Text |
|---|---|
| 0% | |
| 25% | |
| 50% | |
| 100% | |
| Don't Know | |

| Answer Options - lag time | Help Text |
|---|---|
| Hours | |
| Days | |

-continued

Weeks
Months
Years

900. Connectivity (Intrasite, Intersite)
Policy and Procedure Section
1000. Access Management
1001. When a user logs on, does the system display a banner that states employee privacy rights?
1002. Does the organization have guidelines for the composition of passwords?
1003. Does the organization have guidelines for the frequency of changing passwords?
1004. Can more than one employee share a user name and password?
1005. Are contractors, temporary employees, and vendors issued passwords that expire after a fixed duration?
1006. Does someone conduct audits for inactive accounts?
1007. Has the organization had a security incident within the past year that has resulted in lost or corrupted information or degradation of the performance of the information technology?
2000. Employment Begins/Terminates
2001. Does the organization have an Information Security Policy?
2002. Does each employee receive a copy of the organization's Information Security Policy?
2003. Does each employee sign an agreement agreeing to comply with the organization's Information Security Policy?
2004. Who determines an employee's access privileges on the information system? [pull down menu with the following selections: "employee", manager/supervisor", "system administration", "don't know"]
2005. If an employee leaves the organization, does someone deactivate that person's accounts?
2006. Does the organization have a documented policy that explains the requirements for returning all organization property when employment terminates?
3000. Privacy
3001. Is each employee required to sign an agreement acknowledging their understanding of their privacy rights while using the organization's information systems?
3002. Does the organization have a documented policy concerning the storage, use and access of personal information in the workplace?
3003. Does each employee sign a statement agreeing to unannounced audits of their use of the organization's information system resources?
4000. Acceptable Use of Corporate Information System Assets
4001. Are all users required to sign a statement that describes acceptable use of organization information system resources?
4002. Are users explicitly prohibited from using information resources to send, view, access or store child pornography?
4003. Does the organization have a policy on using corporate computers for personal use?
4004. Do employees use corporate computers to access sites on the Internet?
4005. Are users told of the possible consequences of unacceptable use of corporate information resources?
4006. Are users told how to report improper use of corporate information resources?
5000. Virus Prevention, Detection, Response, Training
5000. Does the organization provide training to each employee in the prevention and detection of computer viruses?
5001 Does the organization have documented policies for responding to computer viruses?
5002 Does the organization train each employee in the proper response B. Example 2

Design
Network Characteristics
General Requirements

The tool will present a log-in screen. For now we'll assume that an administrator account was established during installation.

All answers will be tagged with the userid entered at the login screen.

100. General Questions Section
101. What is the company's name? (input box)
102. What is the company's address? (input box)
103. What type of business is the company in? (pull down menu)

| Answer Options | Help Text |
|---|---|
| Banking | |
| Consulting | |
| Education | |
| Government | |
| Insurance | |
| Medical | |
| Retail | |
| Technology | |
| Transportation | |
| Utilities | |

104. How is the network administered? (pull down menu)

| Answer Options | Help Text |
|---|---|
| Distributed administration | We have several different administrators, each with sole control of, and responsibility for, the administration of a certain aspect of the network |
| Centralized administration | We have one office which controls and administers the entire network. |
| Combination | There are local administrators with certain responsibilities, and a central office responsible for other areas of administration. |

If the answer to question 104 is "Distributed Administration," then ask question 106:

106. How are the areas of distributed administration responsibility defined?(pull down menu)

| Answer Options | Help Text |
|---|---|
| LANs | |
| IP address ranges | |
| Router boundaries | |
| Access to file servers | |

If the answer to question 106 is "LANs," then ask question 107:

107. What are the LAN domain names? (Input boxes—there will be several answers.)

If the answer to question 106 is "IP address ranges," then ask question 108:

108. What are the IP address ranges? (Input boxes—there will be several answers.)

If the answer to question 106 is "Router boundaries," then ask question 109:

109. What are the Router addresses? (Input boxes—there will be several answers.)

If the answer to question 106 is "Access to file servers," then ask question 110:

110. What are the file server names? (Input boxes—there will be several answers.)

Note: The answers to these questions will be used as the way that the analysis/roll up can be done—by tagging all the questions asked of LAN x administrator with the answers to this question)

111. What name should be given to this risk analysis? (input box)

200. Database

300. Email

400. Web

401. Enter information about all the web servers. (Input box for web server name, pull down menus for OS platform, OS version and Function. See question 801 for an explanation of how the pull down menus for OS platform and OS version should work.)

| Server Name | Server Type | OS platform | OS version | Function |
|---|---|---|---|---|

| Answer Options - Server Type | Answer Options - Version | Help Text |
|---|---|---|
| Apache | x.x | |
| Netscape | x.x | |

| Answer Options - OS platform | Answer Options - OS Version | Help Text |
|---|---|---|
| Solaris | 2.4, 2.5.1, 2.6, 2.7, 2.8 | |
| RedHat Linux | 5.2, 6.0, 6.1 | |
| Windows | 3.1, 95, 98, NT | |
| HP-UX | 9.x, 10.10, 10.20, 11.0 | |

| Answer Options - Function | Help Text |
|---|---|
| E-Commerce on Internet | |
| Host Internet web site | |
| Intraoffice applications | |
| Interoffice applications | |

402. Has a security configuration guide been consulted for installing and testing each web server? (pull down menu—Yes, No, Don't Know)

403. Which web servers have experienced a security breach within the six months? (pull down menu with server names from 401, plus "None" and "Don't Know".)

404. Which web servers have experienced a security breach within the last year? (pull down menu with server names from 401, plus "Non" and "Don't Know".)

500. File Server (NFS)

600. Network Information (DNS, NIS, NIS+)

700. Critical Infrastructure Components (routers, firewalls, modem banks, etc)

800. Desktops (installation, OSpatches, user access, trust)

801. Enter all the operating systems which are used as clients on the network. (pull down menus, as follows. If user chooses Solaris for "OS client", the version numbers in the pull down menu under "Version" automatically change to reflect the possible Solaris versions. User should have options at the bottom for "OK" to enter the next operating system, "Done" to indicate all operating systems have been entered, "Back" to look at the previous operating system entered, and "Next" to move forward. There should be a summary presented of all the information chosen for this question after the user hits "Done". Require user to enter "Done" on the summary screen to move ahead to next question.)

OS Client Version Internet Connection Num Clients % Patched Lag time

| Answer Options - OS client | Answer Options - Version | Help Text |
|---|---|---|
| Solaris | 2.4, 2.5.1, 2.6, 2.7, 2.8 | |
| RedHat Linux | 5.2, 6.0, 6.1 | |
| Windows | 3.1, 95, 98, NT | |
| HP-UX | 9.x, 10.10, 10.20, 11.0 | |

| Answer Options - Internet Connectivity | Help Text |
|---|---|
| Yes | |
| No | |
| Don't Know | |
| HP-UX | |

| Answer Options - Num Clients | Help Text |
|---|---|
| 1–5 clients | |
| 6–10 clients | |
| 11–20 clients | |
| 21–50 clients | |
| 51–100 clients | |
| More than 100 clients | |

| Answer Options - % patched | Help Text |
|---|---|
| 0% | |
| 25% | |
| 50% | |
| 100% | |
| Don't Know | |

| Answer Options - lag time | Help Text |
|---|---|
| Hours | |
| Days | |
| Weeks | |
| Months | |
| Years | |

900. Connectivity (intrasite, intersite) Policy and Procedures

1000. Access management

1001. When a user logs on, does the system display a banner that states employee privacy rights?

1002. Does the organization have guidelines for the composition of passwords?

1003. Does the organization have guidelines for the frequency of changing passwords?

1004. Can more than one employee share a user name and password?

1005. Are contractors, temporary employees, and vendors issued passwords that expire after a fixed duration?

1006. Does someone conduct audits for inactive accounts?

1007. Has the organization had a security incident within the past year that has resulted in lost or corrupted information or degradation of the performance of the information technology?
2000. Employment begins/terminates
2001. Does the organization have an Information Security Policy?
2002. Does each employee receive a copy of the organization's Information Security Policy?
2003. Does each employee sign an agreement to comply with the organization's Information Security Policy?
2004. Who determines an employee's access privileges on the information system? [pull down menu with the following selections: "employee", "manager/supervisor", "system administration", "don't know"]
2005. If an employee leaves the organization, does someone deactivate that person's accounts?
2006. Does the organization have a documented policy that explains the requirements for returning all organization property when employment terminates?
3000. Privacy
3001. Is each employee required to sign an agreement acknowledging their understanding of their privacy rights while using the organization's information systems?
3002. Does the organization have documented policy concerning the storage, use and access of personal information in the workplace?
3003. Does each employee sign a statement agreeing to unannounced audits of their use of the organization's information system resources?
4000. Acceptable use of corporate information system assets
4001. Are all users required to sign a statement that describes acceptable use of organization information system resources?
4002. Are users explicitly prohibited from using information resources to send, view, access or store child pornography?
4003. Does the organization have a policy on using corporate computers for personal use?
4004. Do employees use corporate computers to access sites on the internet?
4005. Are users told of the possible consequences of unacceptable use of corporate information resources?
4006. Are users told how to report improper use of corporate information resources?
5000. Virus prevention, detection, response, training
5001. Does the organization provide training to each employee in the prevention and detection of computer viruses?
5002. Does the organization have documented policies for responding to computer viruses?
5003. Does the organization train each employee in the proper response to virus incidents?

VI. Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method, comprising:
   determining, in a computer, an entity type corresponding to an entity;
   authenticating, in the computer, a first user associated with information technology infrastructure of the entity;
   authenticating, in the computer, a second user associated with information handling of the entity;
   selecting, in the computer, information technology infrastructure questions associated with the entity type from a pool of questions;
   selecting, in the computer, information handling questions associated with the entity type from the pool of questions;
   presenting the selected information technology infrastructure questions from the computer to the first user and receiving corresponding user responses in the computer;
   presenting the selected information handling questions from the computer to the second user and receiving corresponding user responses in the computer;
   selecting, in the computer, an additional question from the pool of questions in response to one or more of the user responses;
   presenting the additional question from the computer to at least one of the users and receiving a corresponding user response in the computer;
   assessing information security in the computer, including comparing the user responses, including the user response to the additional question, to computer implemented logical associations between possible responses to the selected questions and corresponding vulnerability statements, wherein the comparing includes assessing an aspect of information security that relates to a combination of information technology infrastructure and information handling by comparing user responses associated with a combination of at least one of the information technology infrastructure questions and at least one of the information handling questions to a corresponding logical association; and
   outputting, from the computer, one or more of the vulnerability statements that correspond to the user responses.

2. The method according to claim 1, wherein the selecting information technology infrastructure questions includes selecting information technology infrastructure questions regarding one or more of:
   network characteristics;
   components;
   configuration; and
   connectivity.

3. The method according to claim 1, wherein the selecting of information handling questions includes selecting information handling questions regarding one or more of policy, procedure, training, and awareness, as it relates to information technology infrastructure.

4. The method according to claim 3, wherein the selecting of information handling questions further includes selecting information handling questions regarding one or more of policy, procedure, and training and awareness, as it relates to one or more of:

human resources information handling;
intellectual property information handling;
enterprise security information handling;
financial information handling;
accounting information handling;
customer information handling;
vendor information handling;
legal information handling;
employee information handling;
regulatory information handling;
compliance information handling; and
mergers and acquisition information handling.

5. The method according to claim 1, wherein:
the selecting information technology infrastructure questions includes selecting information technology infrastructure questions regarding one or more of network characteristics, components, configuration, and connectivity; and
the selecting of information handling questions includes selecting information handling questions regarding one or more of policy, procedure, and training and awareness.

6. The method according to claim 1, further comprising:
associating, in the computer, one or more of the first and second users with one or more areas of expertise;
wherein one or more of the selecting the information technology infrastructure questions and the selecting the information handling questions includes selecting questions based on the one or more areas of expertise of the corresponding user.

7. The method according to claim 6, wherein the associating one or more of the first and second users with one or more areas of expertise includes one or more of:
receiving administrator input indicative of the one or more areas of expertise to associate with one or more of the first and second users; and
receiving input from one or more of the first and second users indicative of the one or more areas of expertise.

8. The method according to claim 6, wherein the selecting questions based on one or more information technology infrastructure areas of expertise includes selecting questions related to one or more of:
local area network;
wide area network;
e-mail server;
application program;
database;
web server; and
policy and architecture.

9. The method according to claim 1, further comprising:
receiving a query in the computer from a user related to a question presented to the user; and
providing information from the computer to the user in response to the query.

10. The method according to claim 1, further comprising executing a testing/diagnostic application on command of a user, wherein the assessing of information security includes assessing the information security based on the user responses and results of the testing/diagnostic application.

11. The method according to claim 1, further comprising displaying a working aid from the computer during the presenting of one or more of the selected information technology infrastructure questions and the presenting of the selected information handling questions.

12. The method according to claim 1, further comprising displaying a working aid and a report from the computer.

13. The method according to claim 1, further comprising, presenting groups of questions to one or more of the first and second users, wherein the groups of questions correspond to areas of expertise.

14. A computer program product comprising a computer readable storage medium having computer program logic stored thereon, the computer program logic comprising instructions that, when executed by a processor, cause the processor to perform the steps of:
authenticating a first user associated with information technology infrastructure of an entity and authenticate a second user associated with information handling of the entity;
selecting information technology infrastructure questions and information handling questions corresponding to an entity type of the entity from a pool of questions, present the selected information technology infrastructure questions to the first user, present the selected information handling questions to the second user, and receive corresponding user responses from the first and second users;
selecting an additional question from the pool of questions in response to one or more of the user responses, present the additional question to at least one of the users and receive a corresponding user response; assess information security related to a combination of information technology infrastructure and information handling associated with the entity, wherein the assessing includes comparing the user responses, including the user response to the additional question, to logical associations between possible responses to the selected questions and corresponding vulnerability statements, and
assessing an aspect of information security that relates to a combination of information technology infrastructure and information handling by comparing user responses associated with a combination of at least one of the information technology infrastructure questions and at least one of the information handling questions to a corresponding logical association.

15. The computer program product of claim 14, wherein the instructions that cause the processor to select information technology infrastructure questions comprise instructions to cause the processor to select information technology infrastructure questions regarding one or more of:
network characteristics;
components;
configuration; and
connectivity.

16. The computer program product of claim 14, wherein the instructions that cause the processor to select information handling questions comprise instructions to cause the processor to select information handling questions regarding one or more of policy, procedure, training, and awareness, as it relates to information technology infrastructure.

17. The computer program product of claim 16, wherein the instructions that cause the processor to select information handling questions further comprise instructions to cause the processor to select information handling questions as it relates to one or more of:
human resources information handling;
intellectual property information handling;
enterprise security information handling;
financial information handling;
accounting information handling;

customer information handling;
vendor information handling;
legal information handling;
employee information handling;
regulatory information handling;
compliance information handling; and
mergers and acquisition information handling.

18. The computer program product of claim 14, wherein the instructions that cause the processor to select information technology infrastructure questions comprise instructions to cause the processor to select information technology infrastructure questions regarding one or more of network characteristics, components, configuration, and connectivity, and to select information handling questions regarding one or more of policy, procedure, and training and awareness.

19. The computer program product of claim 14, wherein the instructions further cause the processor to perform the steps of:
associating one or more of the first and second users with one or more areas of expertise;
wherein the instructions that cause the processor to select information technology infrastructure questions and information handling questions comprise instructions to cause the processor to select one or more of the information technology infrastructure questions and the information handling questions based on the one or more areas of expertise of the corresponding user.

20. The computer program product of claim 19, wherein the instructions that cause the processor to authenticate the first and second users includes instructions that cause the processor to perform one or more of:
receiving administrator input indicative of the one or more areas of expertise to associate with one or more of the first and second users; and
receiving input from one or more of the first and second users indicative of the one or more areas of expertise.

21. The computer program product of claim 19, wherein the instructions that cause the processor to select the information technology infrastructure questions comprise instructions that cause the processor to select information technology infrastructure questions corresponding to one or more of:
local area network;
wide area network;
e-mail server;
application program;
database;
web server; and
policy and architecture.

22. The computer program product of claim 14, wherein the instructions further cause the processor to:
query a knowledge database in response to a user query related to a question presented to the user, and to provide a corresponding response to the user.

23. The computer program product of claim 14, wherein the instructions further cause the processor to:
invoke diagnostic logic;
wherein the instructions that cause the processor to assess information security comprise instructions that cause the processor to to assess the information security based on the user responses and results of the diagnostic logic.

24. The computer program product of claim 14, wherein the instructions further cause the processor to:
display a working aid with one or more of the questions.

25. The computer program product of claim 14, wherein the instructions further cause the processor to:
display a working aid with a report.

26. The computer program product of claim 14, further including instructions that, when executed, cause the processor to:
present groups of questions corresponding to areas of expertise to one or more of the first and second users.

* * * * *